US010977092B2

(12) United States Patent
Raman et al.

(10) Patent No.: US 10,977,092 B2
(45) Date of Patent: Apr. 13, 2021

(54) METHOD FOR EFFICIENT TASK SCHEDULING IN THE PRESENCE OF CONFLICTS

(71) Applicant: QUALCOMM Incorporated, San Diego, CA (US)

(72) Inventors: Arun Raman, Fremont, CA (US); Tushar Kumar, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 14/884,979

(22) Filed: Oct. 16, 2015

(65) Prior Publication Data

US 2017/0109217 A1    Apr. 20, 2017

(51) Int. Cl.
*G06F 9/46* (2006.01)
*G06F 9/52* (2006.01)
*G06F 9/50* (2006.01)

(52) U.S. Cl.
CPC ............ *G06F 9/524* (2013.01); *G06F 9/5027* (2013.01); *G06F 9/52* (2013.01)

(58) Field of Classification Search
CPC ........... G06F 9/524; G06F 9/5027; G06F 9/52
USPC ......................................................... 718/104
See application file for complete search history.

(56) References Cited

U.S. PATENT DOCUMENTS

| | | | |
|---|---|---|---|
| 6,829,216 B1 * | 12/2004 | Nakata | H04J 14/0227 370/228 |
| 7,467,383 B2 | 12/2008 | Inchingolo et al. | |
| 7,735,089 B2 | 6/2010 | Chan | |
| 8,271,986 B2 * | 9/2012 | Jiang | G06F 9/52 718/104 |
| 8,756,605 B2 | 6/2014 | Aingaran et al. | |
| 8,887,163 B2 | 11/2014 | Rastogi | |
| 8,918,793 B2 | 12/2014 | Balko | |
| 9,690,595 B2 * | 6/2017 | Das | G06F 9/4405 |
| 2007/0006070 A1 * | 1/2007 | Baartman | G06F 17/30448 715/234 |

(Continued)

FOREIGN PATENT DOCUMENTS

WO    2005066778 A2    7/2005

OTHER PUBLICATIONS

Theodore Johnson, "A Concurrent Dynamic Task Graph", 1993 International Conference on Parallel Processing (Year: 1993).*

(Continued)

*Primary Examiner* — Bradley A Teets
(74) *Attorney, Agent, or Firm* — The Marbury Law Group/QUALCOMM

(57) ABSTRACT

Embodiments include computing devices, apparatus, and methods implemented by a computing device for task scheduling in the presence of task conflict edges on a computing device. The computing device may determine whether a first task and a second task are related by a task conflict edge. In response to determining that the first task and the second task are related by the task conflict edge, the computing device may determine whether the second task acquires a resource required for execution of the first task and the second task. In response to determining that the second task fails to acquire the resource, the computing device may assign a dynamic task dependency edge from the first task to the second task.

26 Claims, 16 Drawing Sheets

(56) References Cited

U.S. PATENT DOCUMENTS

| | | | |
|---|---|---|---|
| 2011/0321051 A1* | 12/2011 | Rastogi | G06F 9/4881 |
| | | | 718/102 |
| 2012/0198461 A1* | 8/2012 | Saxe | G06F 9/5027 |
| | | | 718/103 |
| 2012/0230267 A1* | 9/2012 | Sundaresan | H04W 72/06 |
| | | | 370/329 |
| 2012/0324472 A1* | 12/2012 | Rossbach | G06F 9/467 |
| | | | 718/106 |
| 2014/0101673 A1 | 4/2014 | Klyuchevskyy et al. | |
| 2014/0282574 A1 | 9/2014 | Marathe et al. | |
| 2016/0103677 A1* | 4/2016 | Melski | G06F 9/52 |
| | | | 717/120 |
| 2016/0335583 A1* | 11/2016 | Suntinger | G06Q 10/063114 |

OTHER PUBLICATIONS

International Search Report and Written Opinion—PCT/US2016/051708—ISA/EPO—dated Dec. 22, 2016.

Wang S.H., et al., "Towards Efficient Algorithms for Deadlock Detection and Resolution in Distributed Systems", Proceedings of the International Conference on Data Engineering, Los Angeles, Feb. 6-10, 1989; [Proceedings of the International Conference on Data Engineering], Washington, IEEE Computer Society Press, US, vol. Conf. 5, No. 1989, Feb. 6, 1989, pp. 287-294, XP000041894, DOI: 10.11 09/ICDE.1989.47228, ISBN: 978-0-8186-9915-3.

\* cited by examiner

METHOD FOR EFFICIENT TASK SCHEDULING IN THE PRESENCE OF CONFLICTS

BACKGROUND

Applications that are responsive and high-performance may improve user experience. The task-parallel programming model is widely used to develop applications that exhibit high-performance and are responsive to users. In this model of application development, computation in an application is split into tasks—small chunks of work—with some tasks being specified to run after some other tasks finish, these are called task dependencies. Managing the execution of parallel tasks to avoid conflicts and support interdependencies among tasks presents a programming challenge.

SUMMARY

The methods and apparatuses of various embodiments provide circuits and methods for task scheduling in the presence of task conflict edges on a computing device. Various embodiments may include determining whether a first task and a second task are related by a task conflict edge, determining whether the second task acquires a resource required for execution of the first task and the second task in response to determining that the first task and the second task are related by the task conflict edge, and assigning a dynamic task dependency edge from the first task to the second task in response to determining that the second task fails to acquire the resource.

In some embodiments, assigning a dynamic task dependency edge from the first task to the second task in response to determining that the second task fails to acquire the resource may include determining whether an execution of the first task is complete, and assigning the dynamic task dependency edge from the first task to the second task in response to determining that the execution of the first task is not complete.

In some embodiments, assigning a dynamic task dependency edge from the first task to the second task in response to determining that the second task fails to acquire the resource may include locking the first task, assigning the dynamic task dependency edge from the first task to the second task after locking the first task, and unlocking the first task.

In some embodiments, assigning a dynamic task dependency edge from the first task to the second task may include removing an indicator of the task conflict edge from a data structure, and adding an indicator of the dynamic task dependency edge to the data structure.

Some embodiments may further include the first task acquiring the resource, in which a deadlock and a cyclic dynamic task dependency may be avoided by requiring that the resource be processed in an order related to at least one other resource required for execution of the second task or a third task, signaling a processor core assigned to execute the second task to enter an idle state in response to assigning the dynamic task dependency edge from the first task to the second task, receiving a signal that the first task is complete, and signaling the processor core assigned to execute the second task to wake up from the idle state.

Some embodiments may further include determining whether a conflict policy is met, and determining whether the second task is a ready task in response to determining that the conflict policy is met instead of assigning the dynamic task dependency edge from the first task to the second task in response to determining that the second task fails to acquire the resource.

In some embodiments determining whether the conflict policy is met further may include determining whether a threshold amount of dynamic task dependency edges are assigned to the second task in an assignment session.

In some embodiments, the conflict policy may include a threshold amount of dynamic task dependency edges assigned to the second task in an assignment session, and the threshold amount of dynamic task dependency edges is determined based at least on one of power consumption for execution tasks, task execution latency, and criticality of the second task.

Various embodiments may include a computing device configured for task scheduling in the presence of task conflict edges. The computing device may include a resource, including a memory device, required for execution of a first task and a second task, a plurality of processor cores communicatively connected to each other including a first processor core, a second processor core, and a third processor core, in which the second processor core and the third processor core are communicatively connected to the resource and the first processor core is configured with processor-executable instructions to perform operations of one or more of the embodiment methods described above.

Various embodiments may include a computing device configured for task scheduling in the presence of task conflict edges having means for performing functions of one or more of the embodiment methods described above.

Various embodiments may include a non-transitory processor-readable storage medium having stored thereon processor-executable instructions configured to cause a processor of a computing device to perform operations of one or more of the embodiment methods described above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
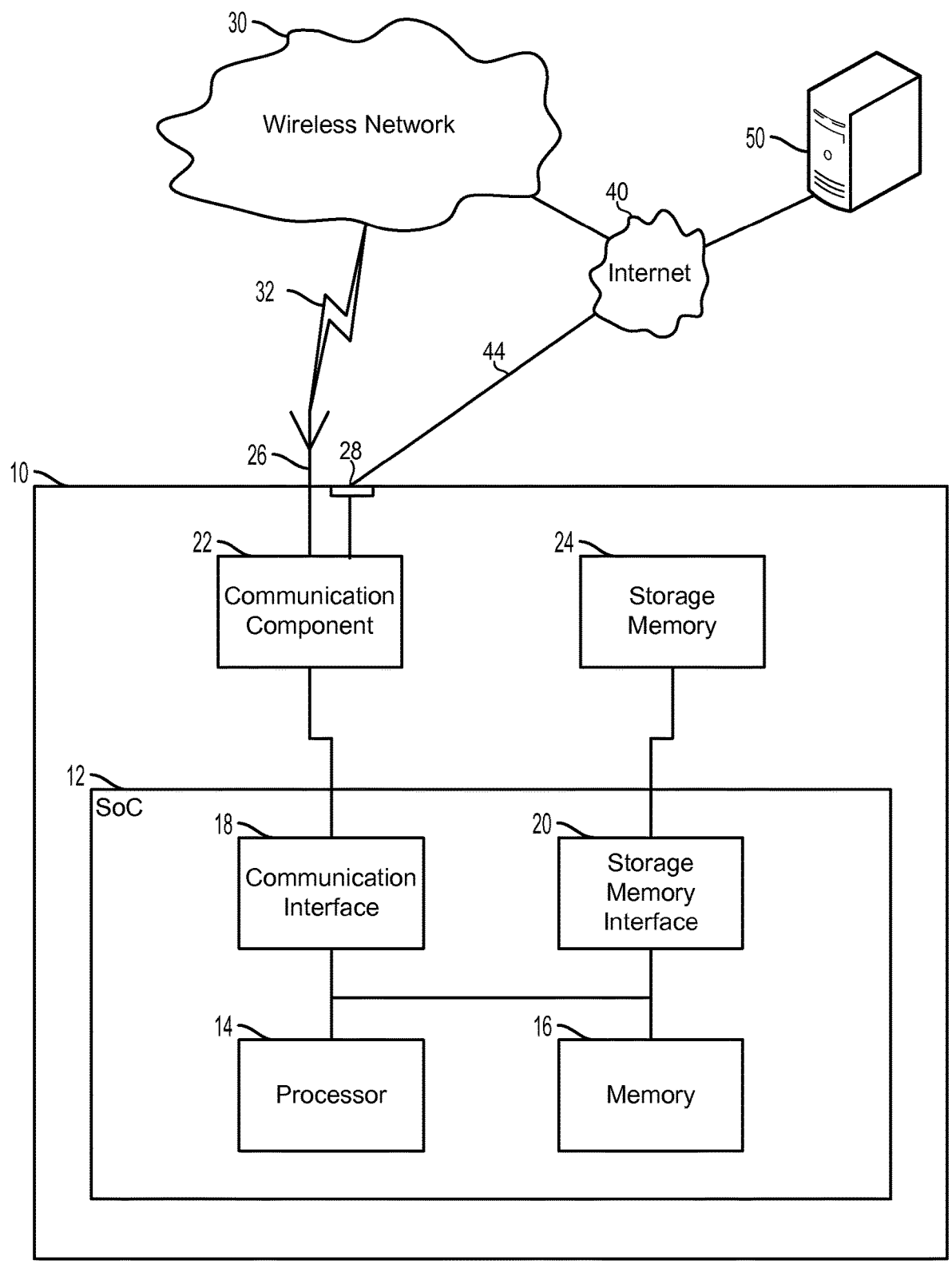
FIG. 1 is a component block diagram illustrating a computing device suitable for implementing an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a multi-core programmable processor. While the various embodiments are particularly useful for mobile computing devices, such as smartphones, which have limited memory and battery resources, the embodiments are generally useful in any electronic device that implements a plurality of memory devices and a limited power budget in which reducing the power consumption of the processors can extend the battery-operating time of a mobile computing device. The term "computing device" may further refer to stationary computing devices including personal computers, desktop computers, all-in-one computers, work stations, super computers, mainframe computers, embedded computers, servers, home theater computers, and game consoles.

Embodiments include methods, and systems and devices implementing such methods for improving device performance by providing efficient execution of parallel tasks using scheduling techniques that account for task dependencies and task conflicts. The methods, systems, and devices may replace a resource conflict between tasks with a dynamic task dependency, ensuring that adding the dynamic task dependency only occurs when a task owns a resource subject to the resource conflict until after adding the dynamic task dependency, and controlling the frequency of rescheduling a task subject to a dynamic task dependency by specifying a limit of conflicts identified before rescheduling.

Task dependencies enforce an a priori ordering of task execution. A dependency t1→t2 ("→" denotes a dependency) specifies that task t1 must finish before task t2 begins execution, but not the other way around. Some tasks may be related through a "task conflict". A conflict t1=t2 ("=" denotes a task conflict) specifies that either task t1 must finish before t2 begins execution or task t2 must finish before t1 begins execution, but execution of task t1 and t2 must not overlap. In other words, two tasks related by a task conflict may be scheduled for execution by a task scheduler in either order but not simultaneously. Such task conflicts typically arise due to the tasks requiring exclusive access to one or more shared resources, which may include any physical or virtual component of limited availability of the computing device. Examples of resources may include processing components, processing time, storage or memory components, storage or memory locations, internal and external communication components, internal and external communication bandwidth, electric power components, electric power, input/output components, input/output signals, etc. Sharing of resources may occur, for example, when tasks concurrently write to a memory device, such as a data buffer on two processors with unsynchronized memory access. Task scheduling in the presence of both task dependencies and task conflicts is difficult.

References to a specific resource in the descriptions of various embodiments, including references to physical and virtual resources, are intended to be non-limiting examples. Any resource of the computing device may be subject to any of the descriptions and examples provided herein, and any physical or virtual resources of varying types may be substituted for the resources referenced herein for exemplary purposes.

Because multiple tasks may share resources that cannot be concurrently accessed by the multiple tasks, the dependency and conflict relationships between tasks may affect the scheduling of the tasks. A task conflict may be modeled as a resource acquisition problem. As an example, consider the task conflict $t1=t2$. This conflict may be modeled as both tasks requiring exclusive access to a resource R. If a task has multiple conflicts, then it must acquire exclusive access to all resources associated with those conflicts. In conventional task scheduling without conflicts, a task is ready for execution when all of its dependencies have been satisfied.

In task scheduling with conflicts, the task scheduler must determine whether a ready task is able to acquire exclusive access to all resources and execute without conflicts. Other tasks that conflict with the task under consideration must be scheduled for later execution. For tasks attempting to concurrently access the same resource, a single task may be allowed to access or own the resource and become an owner task. Acquiring ownership of a resource may be implemented in several ways. In various embodiments, the resource may be a named location in memory, with the bytes in memory set to zero or null to indicate that no task owns the resource and the bytes in memory set to the address of the task (or "task pointer") to indicate that the task owns the resource. Acquiring ownership of the named resource successfully may involve atomically checking that the value stored in the memory location of the resource is zero or null, and exchanging the value with the task pointer. A value other than zero or null stored in the memory location of the resource may indicate that the resource is already owned by a different task corresponding to the stored value. The other task(s) may be prevented from accessing the owned resource and rescheduled. The rescheduling may be implemented so that a task that attempts to access a resource owned by an owner task does not continually attempt to access the owned resource and waste power and processing resources by making repeated access attempts.

An initialized first task ("t1"), having a conflict relationship with a second task ("t2"), may make a first attempt to access a resource subject to the conflict. The first task may be successful in accessing the resource when the second task is not already the owner task of the resource, making the first task the owner task of the resource. The first task may be unsuccessful in accessing the resource when the second task is already the owner task of the resource. In response to the unsuccessful attempt to access the resource, the conflict relationship between the first task and the second task can be replaced by a dynamic task dependency relationship t2=>t1 ("=>" denotes a dynamic task dependency) specifying that task t2 must finish, thereby relinquishing owner ship of the resource, before task t1 begins execution.

To avoid the first task, and any tasks with dependencies to the first task, languishing in a waiting state, adding the dynamic task dependency may only occur when the owner task owns the resource subject to the resource conflict until after adding the dynamic task dependency. In an embodiment, in response to determining that the second task is the owner task, the second task may be prevented from finishing until after adding the dynamic task dependency t2=>t1. This may be accomplished by requiring that the owner task be locked in order to finish adding the dynamic task dependency, thereby locking the second task until after adding the dynamic task dependency t2=>t1, and then unlocking the second task so that the second task may finish. In an embodiment, in response to determining that the second task is the owner task, the state of the second task may be checked to determine whether the second task has finished before adding the dynamic task dependency t2=>t1. Either embodiment avoids the problem of setting up a dependency t2=>t1 when the dependency is no longer necessary and causing the first task to wait for a signal that the second task has finished and that the resource subject to the conflict is available, but not receiving such a signal until the next time the second task executes, or not receiving such a signal at all if the second task never executes again. This also avoids a cascading effect of waiting by tasks directly or indirectly dependent on the first task based on the first task not executing.

The access to resources subject to conflicts for the first task with any number of other tasks may be checked. A new dynamic task dependency may be added for the first task each time an access to a resource subject to a conflict is denied. The access to resources subject to conflicts for the first task may be checked for every conflicting task. The first task may be rescheduled based on the added dynamic dependencies. In an embodiment, a policy for rescheduling tasks having a dynamic task dependency added may control how often the first task is rescheduled based on how many dynamic dependencies are added in a checking session. In other words, a policy limiting the number of newly added dynamic dependencies for a task may interrupt the process of checking access to resources subject to conflicts for the first task when the limit is reached and the first task may be rescheduled, even if not all of the access to resources subject to conflicts have been checked for all tasks conflicting with the first task. The remaining access to resources subject to conflicts may be checked on subsequent attempts to execute the first task. The policy may be set for different tasks and for different purposes, such as providing a certain amount of task latency and/or resource consumption.

Naive addition of dynamic dependence edges may create cycles in a previously non-cyclic graph. Deadlocks may be created when multiple tasks concurrently attempt to acquire multiple resources. For example, the first task may attempt to acquire resources, such as a first resource ("R1") and a second resource ("R2"), in order R1 and R2 while concurrently the second task is attempting to acquire R2 then R1. Each task may wait for the availability of a resource owned by the other task causing a deadlock of tasks waiting to acquire resources. Both deadlocks during resource acquisition and the cyclic dependences may be avoided by a number of methods. In various embodiments, resources for a task may always be processed in a canonical order, e.g., sorted order of pointer addresses of the corresponding resource handles for R1 and R2, or in sorted order of unique resource identifiers (IDs) assigned to each resource. In various embodiments, deadlock detection and recovery techniques may be used.

FIG. 1 illustrates a system including a computing device 10 in communication with a remote computing device 50 suitable for use with the various embodiments. The computing device 10 may include a system-on-chip (SoC) 12 with a processor 14, a memory 16, a communication interface 18, and a storage memory interface 20. The computing device may further include a communication component 22 such as a wired or wireless modem, a storage memory 24, an antenna 26 for establishing a wireless connection 32 to a wireless network 30, and/or the network interface 28 for connecting to a wired connection 44 to the Internet 40. The processor 14 may include any of a variety of hardware cores, for example a number of processor cores.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASIC), other programmable logic circuit, discrete gate logic, transistor logic, performance monitoring hardware, watchdog hardware, and time references. Integrated circuits may be configured such that the components of the integrated circuit reside on a single piece of semiconductor material, such as silicon. The SoC 12 may include one or more processors 14. The computing device 10 may include more than one SoCs 12, thereby increasing the number of processors 14 and processor cores. The computing device 10 may also include processors 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. In an embodiment, one or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a miss, because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The communication interface 18, communication component 22, antenna 26, and/or network interface 28, may work in unison to enable the computing device 10 to communicate over a wireless network 30 via a wireless connection 32, and/or a wired network 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information even after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
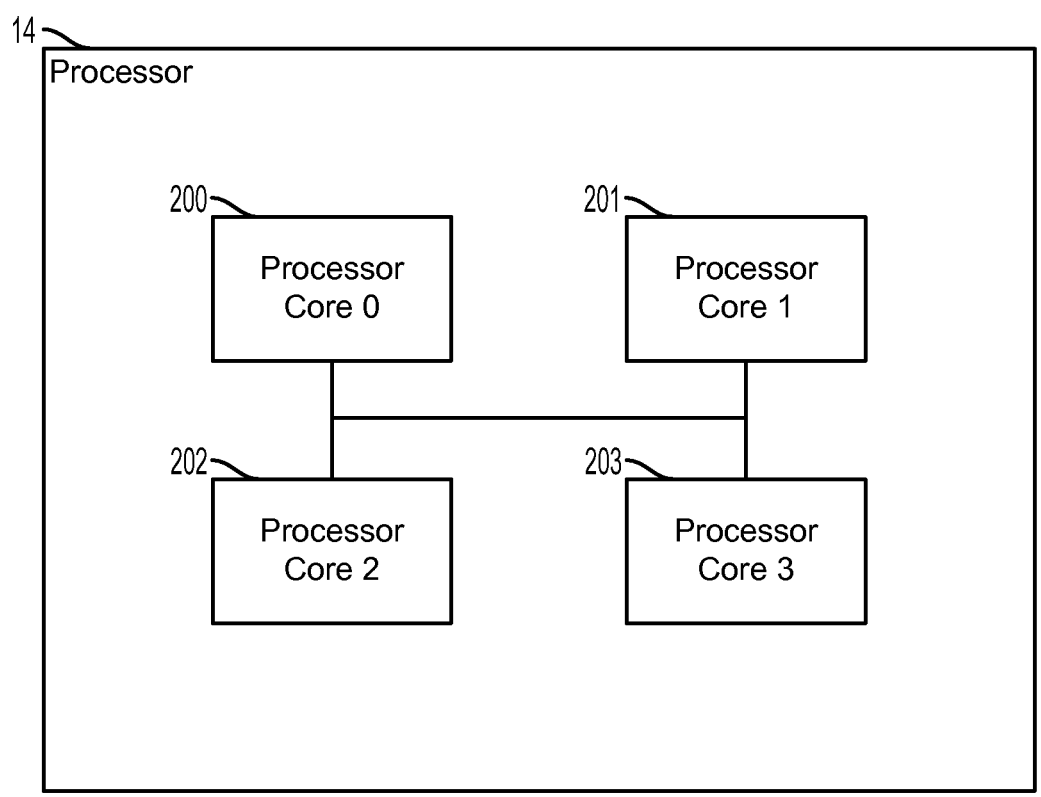
FIG. 2 is a component block diagram illustrating an example multi-core processor suitable for implementing an embodiment.

FIG. 2 illustrates a multi-core processor 14 suitable for implementing various embodiments. The multi-core processor 14 may have a plurality of homogeneous or heterogeneous processor cores 200, 201, 202, 203. The processor cores 200, 201, 202, 203 may be homogeneous in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be homogeneous general purpose processor cores. Alternatively, the processor 14 may be a graphics processing unit or a digital signal processor, and the processor cores 200, 201, 202, 203 may be homogeneous graphics processor cores or digital signal processor cores, respectively. For ease of reference, the terms "processor" and "processor core" may be used interchangeably herein.

The processor cores 200, 201, 202, 203 may be heterogeneous in that the processor cores 200, 201, 202, 203 of a single processor 14 may be configured for different purposes and/or have different performance characteristics. The heterogeneity of such heterogeneous processor cores may include different instruction set architectures, pipelines, operating frequencies, etc. An example of such heterogeneous processor cores may include what are known as "big.LITTLE" architectures in which slower, low-power processor cores may be coupled with more powerful and power-hungry processor cores. In similar embodiments, the SoC 12 may include a number of homogeneous or heterogeneous processors 14.

In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, the four processor cores 200, 201, 202, 203 illustrated in FIG. 2 and described herein are merely provided as an example and in no way are meant to limit the various embodiments to a four-core processor system. The computing device 10, the SoC 12, or the multi-core processor 14 may individually or in combination include fewer or more than the four processor cores 200, 201, 202, 203 illustrated and described herein.

FIGS. 3A-3D illustrate an example task graph in various task graph configurations 300a-300e. The task graph and its various task graph configurations 300a-300e, including tasks 302a-302d, tasks 304a-304c, task dependency edges (denoted by the arrows between the different tasks 302a-302d and 304a), task conflict edges 306a and 306b, and dynamic task dependency edges 308a-308c, are merely exemplary, and may be configured with varying numbers of tasks and varying relationships between tasks.

Figure 3A:
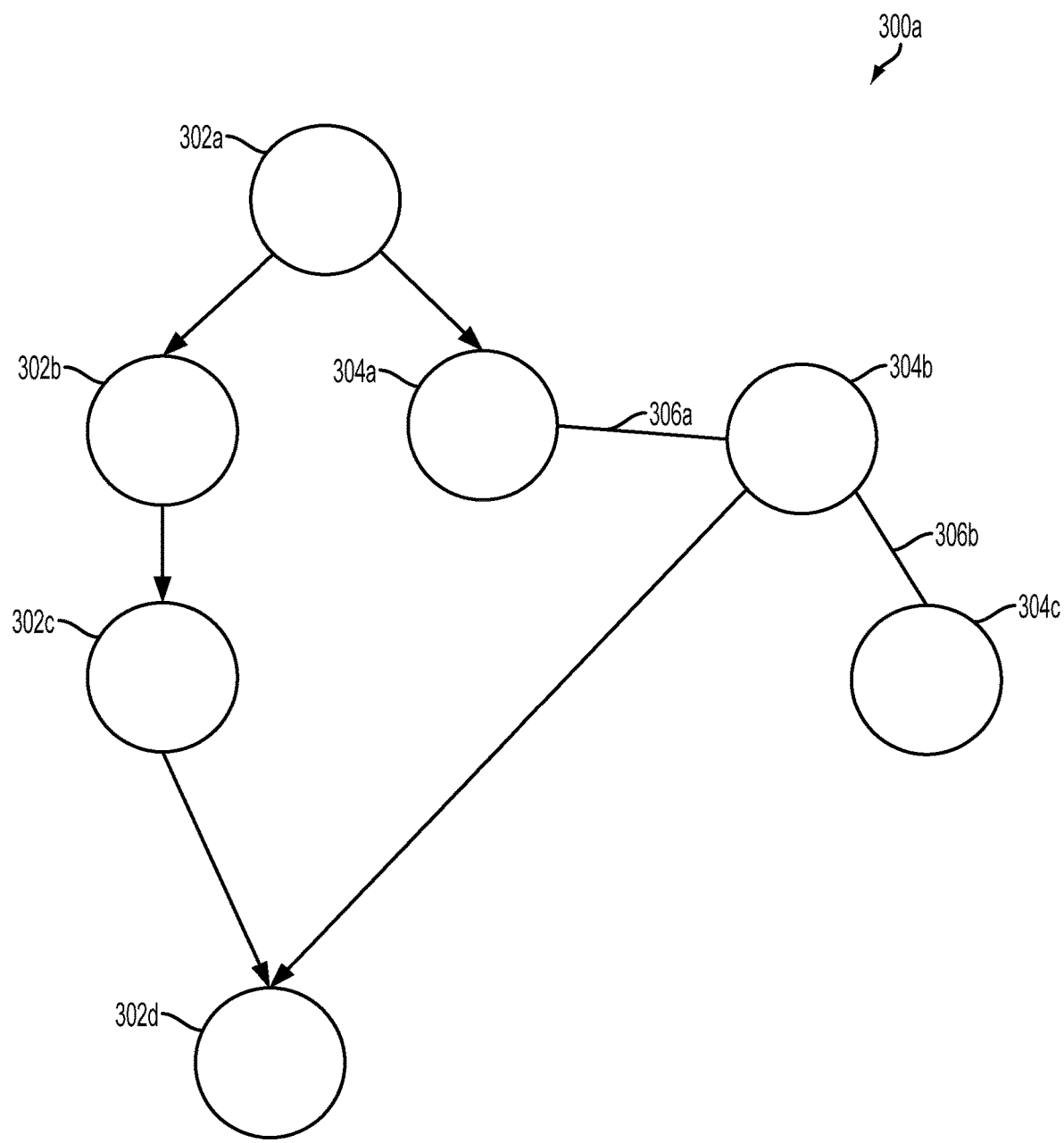
FIGS. 3A-3D are schematic diagrams illustrating example task graphs including dynamic task dependencies according to an embodiment.

FIG. 3A illustrates the example task graph configuration 300a having the tasks 302a-302d and 304a related to each other by task dependency edges. In other words, one task depends from another task such that the dependent task cannot execute before that task from which the dependent task depends. For example, the task 302b depends from the task 302a, thus the task 302b cannot execute before the task 302a completes executing. In a similar manner, the task 304a also depends from the task 302a, the task 302c depends from task the 302b, and the task 302d depends from the task 302c and the task 304b. The task graph configuration 300a also includes the tasks 304a-304c related to each other by the task conflict edges 306a and 306b. In other words, one task does not depend on another task in that two or more tasks that conflict with each other may execute in any order, however two tasks that that conflict with each other may not execute concurrently. The conflict edges 302a and 302b between the tasks 304a-304c may represent that tasks conflicting with each other may require access to the same resource to execute. As such, in this example the task 304a and the task 304b may require the same resource to execute and may not execute concurrently. Similarly, the task 304b and the task 304c may require the same resource to execute and may not execute concurrently.

In various embodiments, a task scheduler (not shown) may replace a task conflict edge with a dynamic task dependency edge. Replacing the task conflict edge with a dynamic task dependency edge may include relating the tasks in a data structure for managing the relationships between tasks. Relating the tasks in the data structure may include adding the task to the data structure such that their placement in the data structure connotes their relationship, or updating a data structure such that existing entries are changed to indicate a new relationship between the tasks. Whether a task conflict edge is replaced by a dynamic task dependency edge may depend on whether a task associated with a task conflict edge is a ready task and whether one or more resources associated with the task conflict edge is available for use by the ready task or is owned by a task conflict related task.

Typically, for a ready task failing to acquire an already owned resource, a thread and/or processor assigned to execute the ready task would spin, continually attempting to acquire the resource until successful, which could take multiple attempts before acquisition, using power, processing, and bandwidth resources of the computing device with each attempt. The scheduler may track the relationships between the tasks. The scheduler may allow the thread and/or processor assigned to execute the ready task to idle, or work on other unrelated ready tasks, as long as the dynamic task dependency edge persists. Upon completion, the resource owner task may signal the scheduler, and the scheduler may remove the dynamic task dependency edge and signal the thread and/or processor assigned to execute the ready task to wake up so that it may attempt to acquire the resource relinquished by the completed task.

In various embodiments, the ready task may relate to multiple other tasks via dynamic edge dependencies, and the scheduler may allow the ready task to acquire the required resources as the required resources become available, or may only allow the ready task to acquire the required resources when all of the required resources are available. Resource availability may be tracked using various techniques. In various embodiments, the resource may be a named location in memory, with the bytes in memory set to zero or null to indicate that no task owns the resource and the bytes in memory set to the address of the task (or "task pointer") to indicate that the task owns the resource. Acquiring ownership of the named resource may involve atomically checking that the value stored in the memory location of the resource is zero or null, and exchanging the value with the task pointer. A value other than zero or null stored in the memory location of the resource may indicate that the resource is already owned by a different task corresponding to the stored value. Deadlocks could be caused by cyclic dynamic dependency edges resulting in the first task waiting to acquire resources owned by the second task that is waiting to acquire resources owned by the first task. To avoid such deadlocks, in various embodiments, the resources for a task may always be processed in a canonical order, e.g., sorted order of pointer addresses of the corresponding resource handles for the resources, or in sorted order of unique resource identifiers (IDs) assigned to each resource. In various embodiments, deadlock detection and recovery techniques may be used. In other words, a deadlock and a cyclic dynamic task dependency may be avoided by requiring the resources required for execution of the first task be processed in an order related to at least one other resource required for execution of another task.

Figure 3B:
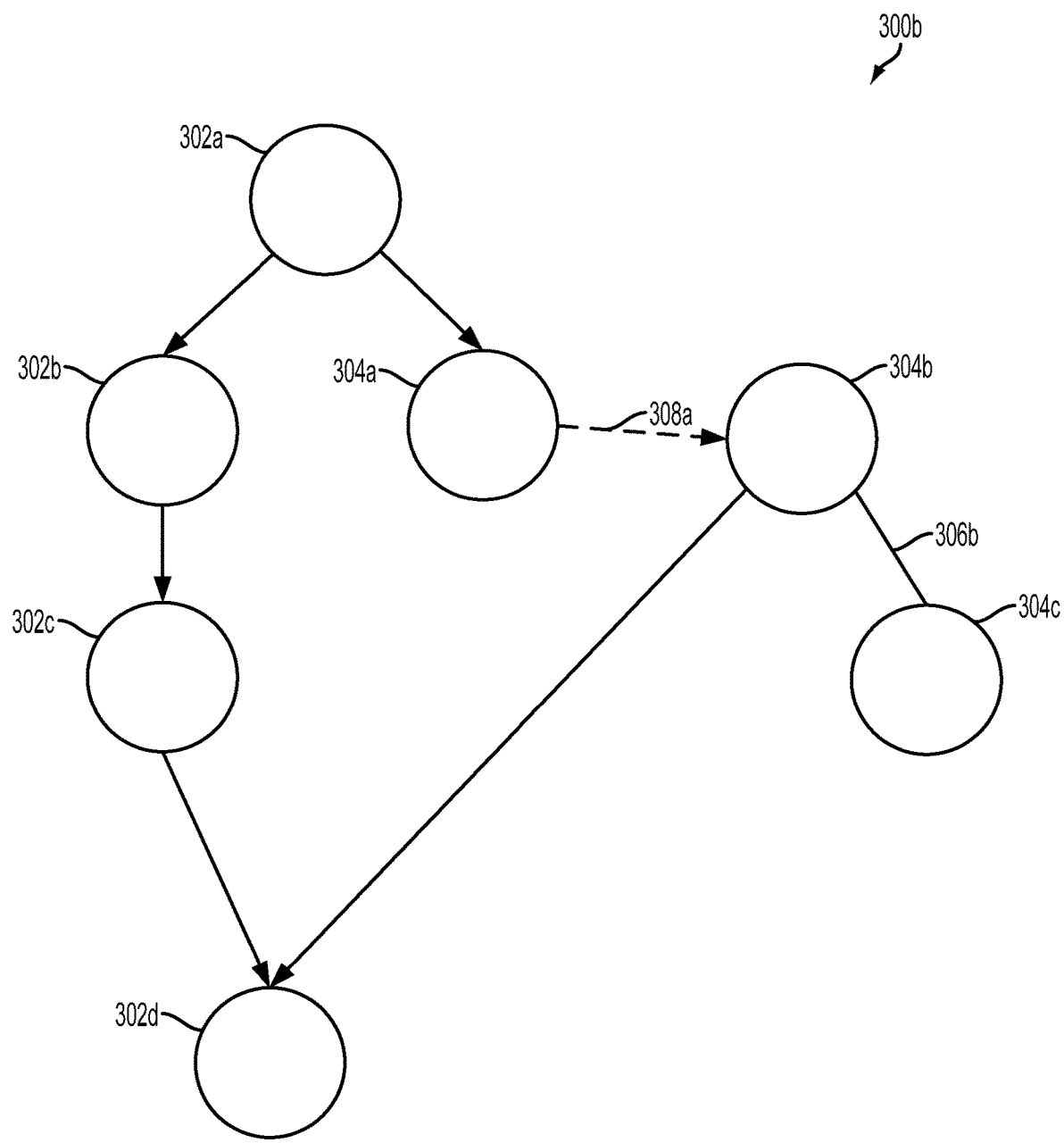

FIG. 3B illustrates the example task graph configuration 300b having the same configuration as the task graph configuration 300a, described with reference to FIG. 3A, with the exception that the dynamic task dependency edge 308a has replaced the task conflict edge 306a. In this example, the task 304a may be a ready task. As such, the task 302a may have completed execution, satisfying the dependency of the task 304a from the task 302a. To execute the task 304a, a thread for executing the task 304a, implemented by one of the processors or processor cores of the computing device, may attempt to and succeed at acquiring a resource required for executing the task 304a. As described herein, the task conflict edge 306a between the task 304a and the task 304b indicates that the both of the tasks 304a and 304b require the same resource to execute.

In some circumstances, the task 304b may also be a ready task, and a thread for executing the task 304b may fail to acquire the resource that both tasks 304a and 304b require to execute. A task scheduler or other module of the computing device may determine that the resource that both of the tasks 304a and 304b require to execute is already owned by the task 304a. Therefore, the task 304b will not be able to execute until the task 304a relinquishes ownership of the resource. In this situation, the task scheduler of the computing device may replace the conflict edge 306a between the task 304a and the task 304b with the dynamic task dependency edge 308a. Changing the conflict edge 306a to the dynamic task dependency edge 308a may signify that the task 304b is now dependent upon completion of the task 304a, thereby relinquishing the required resource for task 304b to execute. Adding the dynamic task dependency edge 308a may signify to the thread for executing the task 304b that the thread may idle, or work on other unrelated ready tasks, until notified that the dynamic task dependency edge 308a is removed, indicating that the task 304a has completed executing and has relinquished the required resource for task 304b to execute. In this example, the task 304c may execute regardless of whether task 304a owns the resource.

Figure 3C:
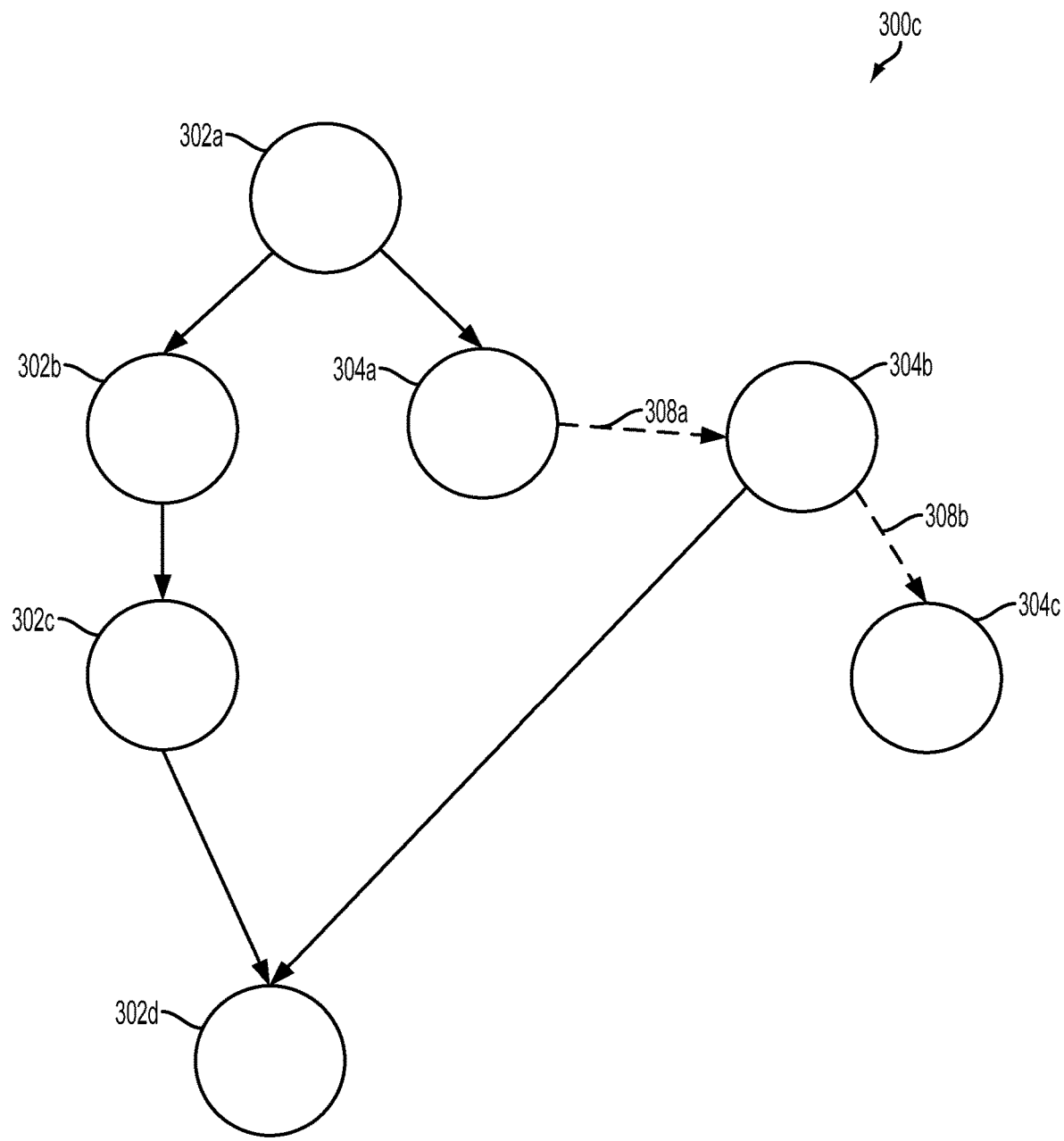

FIG. 3C illustrates the example task graph configuration 300c having the same configuration as the task graph configuration 300a, described with reference to FIG. 3A, with the exception that the dynamic task dependency edge 308a has replaced the task conflict edge 306a, and the dynamic task dependency edge 308b has replaced the task conflict edge 306b. The task graph configuration 300c illustrates an example similar to the example of the task graph configuration 300b described with reference to FIG. 3B. That is, that each of the dynamic task dependency edges 308a and 308b may relate their respective tasks 304a-304c depending on different resources required by their respective tasks 304a-304c. In other words, the example task graph configuration 300c may apply the process of determining the dynamic task dependency edge 308a between the tasks 304a and 304b for a first resource, and the dynamic task dependency edge 308b between the tasks 304b and 304c for a second resource. As a result, the dynamic task dependency edges 308a and 308b may not depend on each other. However, in this example, execution of the tasks 304a-304c may be de facto dependent on each other. Despite the tasks 304a and 304c not requiring the same resources, the task 304c may be dynamically dependent on the task 304b, which may be dynamically dependent on the task 304a. Therefore, the task 304c may not be able to execute until after the task 304b, and the task 304b may not be able to execute until after the task 304a.

The task graph configuration 300c illustrates an example in which the each of the tasks 304a-304c require the same resource to execute. In various embodiments in such circumstances, replacing the task conflict edge 306a with the dynamic task dependency edge 308a may occur in a manner similar to the example of the task graph configuration 300b described with reference to FIG. 3B. In addition, the scheduler may determine that the task 304c may require the same resource to execute as the resource subject to the dynamic task dependency edge 308a. In order to avoid a race condition for the resource relinquished by the task 304a and required by the tasks 304b and 304c, the task scheduler implementing various embodiments may prioritize an order of execution of the tasks 304b and 304c by replacing the task conflict edge 306b with the dynamic task dependency edge 308b. In such a manner, the task 304b may be notified of the availability of the resource relinquished by the task 304a while the task 304c remains idle, or works on other unrelated ready tasks, and the task 304c may be notified of the availability of the resource after it is relinquished by the task 304b.

Figure 3D:
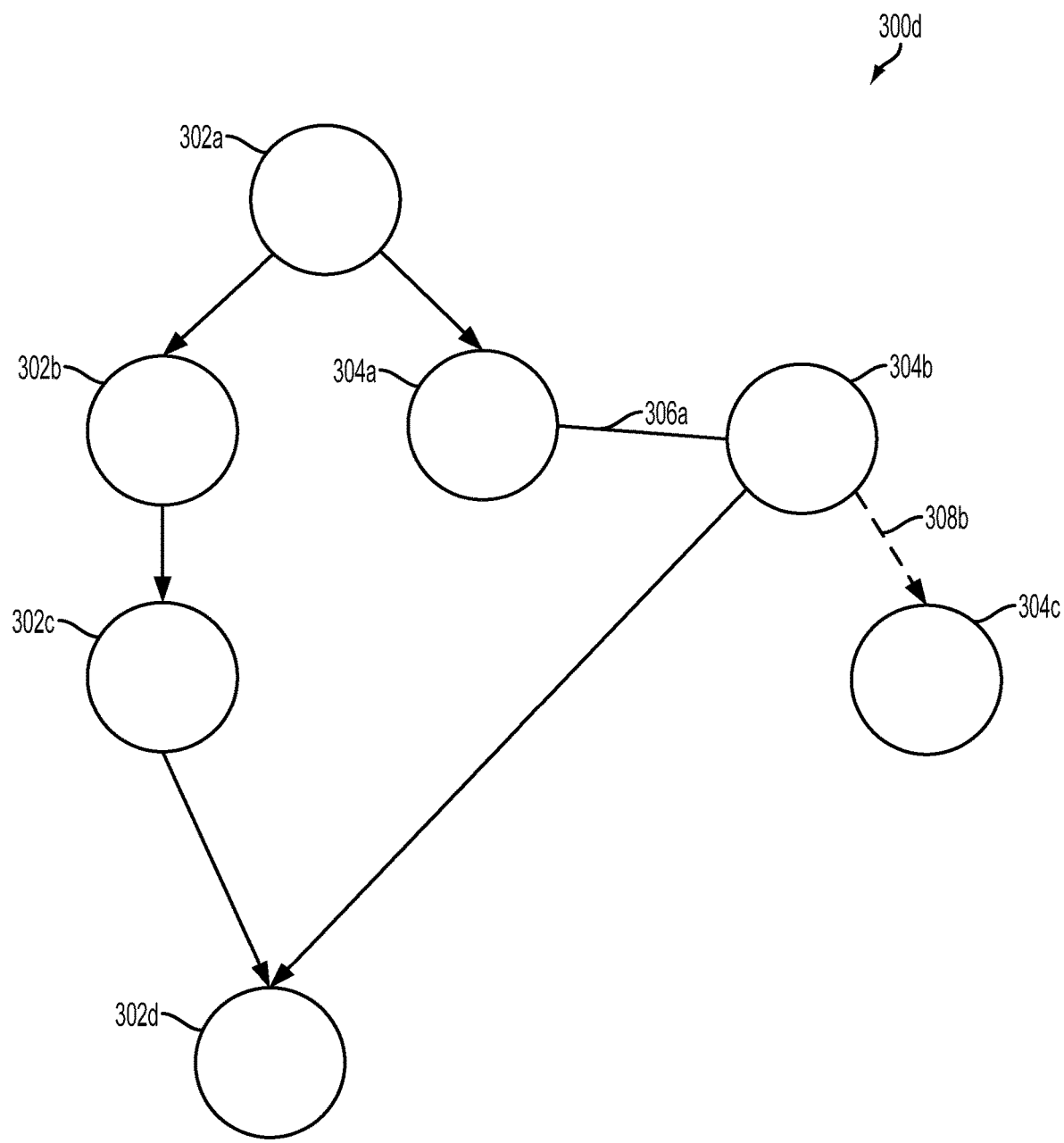

FIG. 3D illustrates an example task graph configuration 300d having the same configuration as the task graph configuration 300a described with reference to FIG. 3A, with the exception that the dynamic task dependency edge 308b has replaced the task conflict edge 306b. The task graph configuration 300d illustrates an example similar to the example of task graph configuration 300b described with reference to FIG. 3B. That is, in the example task graph configuration 300d, the task 304b is the ready task that acquires the resource required by the tasks 304b and 304c. The task 304c fails to acquire the resource it requires to execute because it is owned by the task 304b, so the task scheduler according to various embodiments replaces the task conflict edge 306b with the task dependency edge 308b. A thread and/or processor for executing the task 304c is allowed to idle, or work on other unrelated ready tasks, while the task 304b executes, and is signaled to acquire the resource relinquished by the task 304b after it completes executing. In this example, the task 304a may execute regardless of whether task 304b owns the resource.

FIGS. 4A-4D illustrate an example task graph in various task graph configurations 400a-400d. The task graph and its various task graph configurations 400a-400d, including the tasks 302a-302d, the tasks 304a-304c, the task dependency edges (denoted by the arrows between the different tasks 302a-302d and 304a, and including a task dependency edge 402), the task conflict edges 306a and 306b, and the dynamic task dependency edges 308a and 308b, are merely exemplary, and may be configured with varying numbers of tasks and varying relationships between tasks.

Figure 4A:
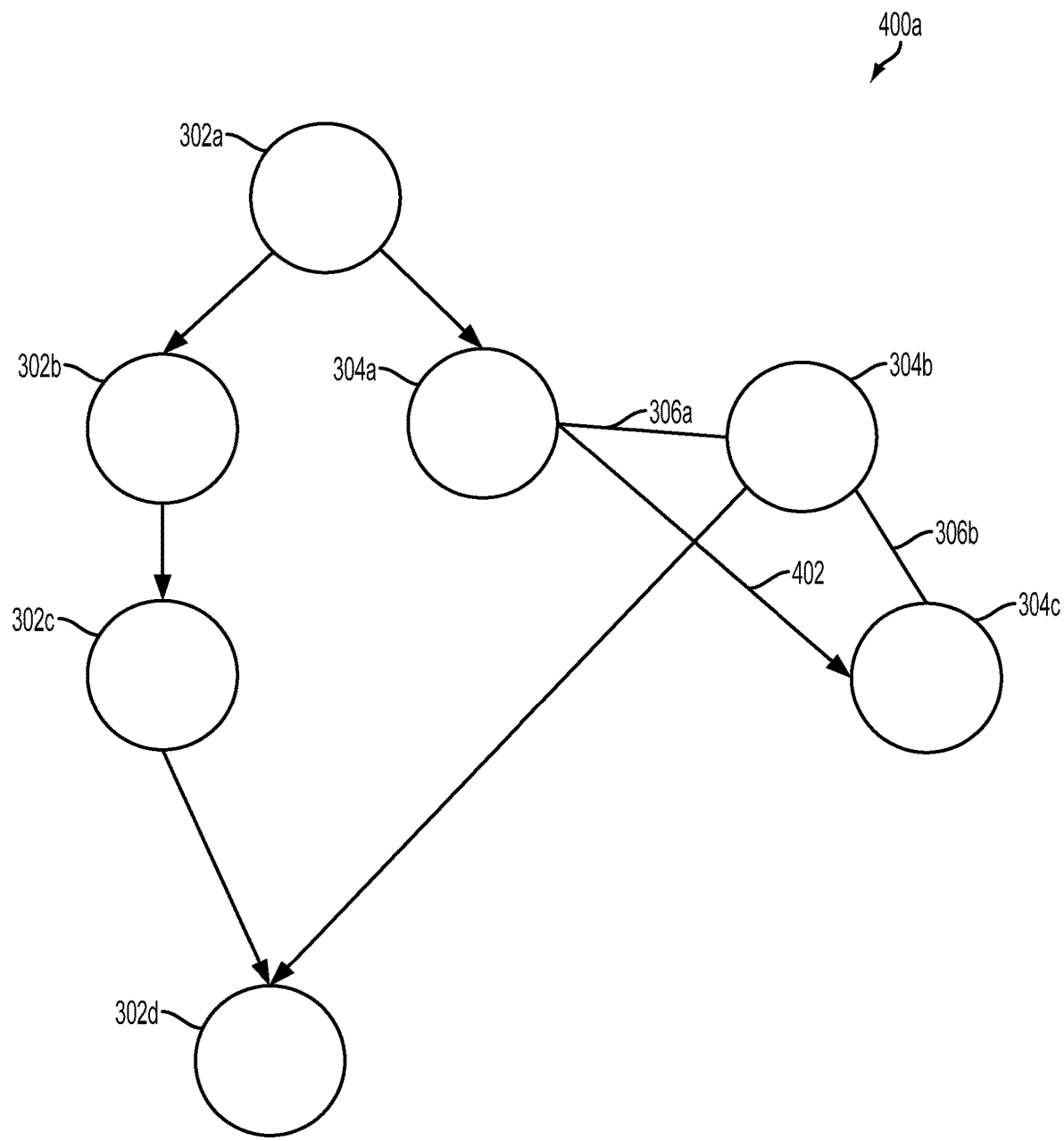
FIGS. 4A-4D are schematic diagrams illustrating example task graphs including dynamic task dependencies according to an embodiment.

FIG. 4A illustrates an example task graph configuration 400a having the same structure as the task graph configuration 300a described with reference to FIG. 3A, with the addition of the task dependency edge 402 between the tasks 304a and 304c. As such, the task graph configuration 400a includes characteristics that are similar to the task graph configuration 300a, except that the task 304c depends from the task 304a, and thus the task 304c cannot execute before the task 304a.

Figure 4B:
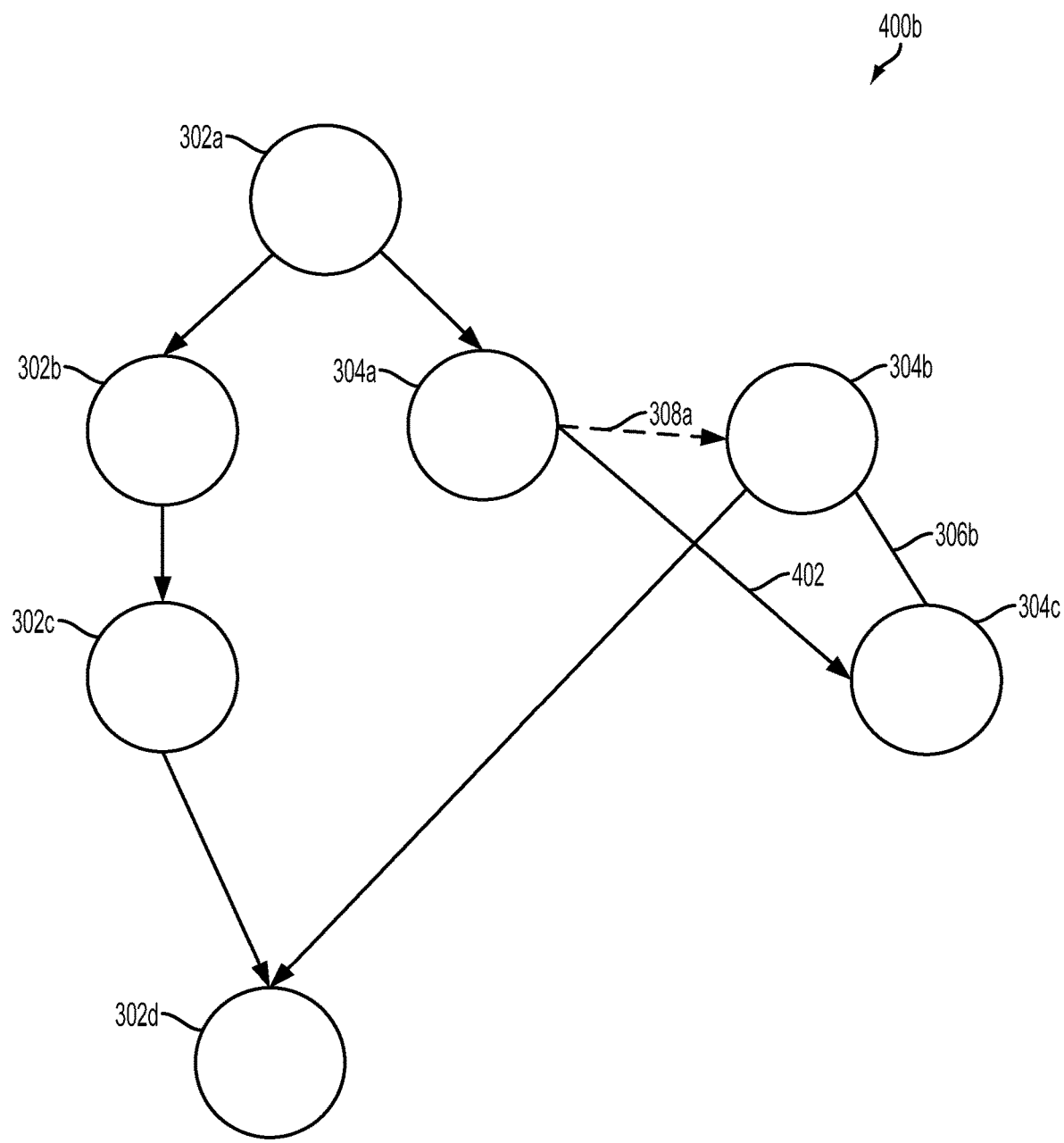

FIG. 4B illustrates an example task graph configuration 400b having the same structure as the task graph configuration 300b described with reference to FIG. 3B, with the addition of the task dependency edge 402 between the tasks 304a and 304c. The execution of the tasks 304a and 304b may be subject to the same example as described for the task graph configuration 300b. The execution of the task 304c may be unaffected by the replacement of the task conflict edge 306a with the dynamic task dependency edge 308a. However, in this example the dynamic task dependency edge 308a between the tasks 304a and 304b is reversed such that the task 304b is the first to acquire the resource required for executing the tasks 304a and 304b. Thus, the task 304c may become de facto dependent upon the task 304b via the task 304a.

Figure 4C:
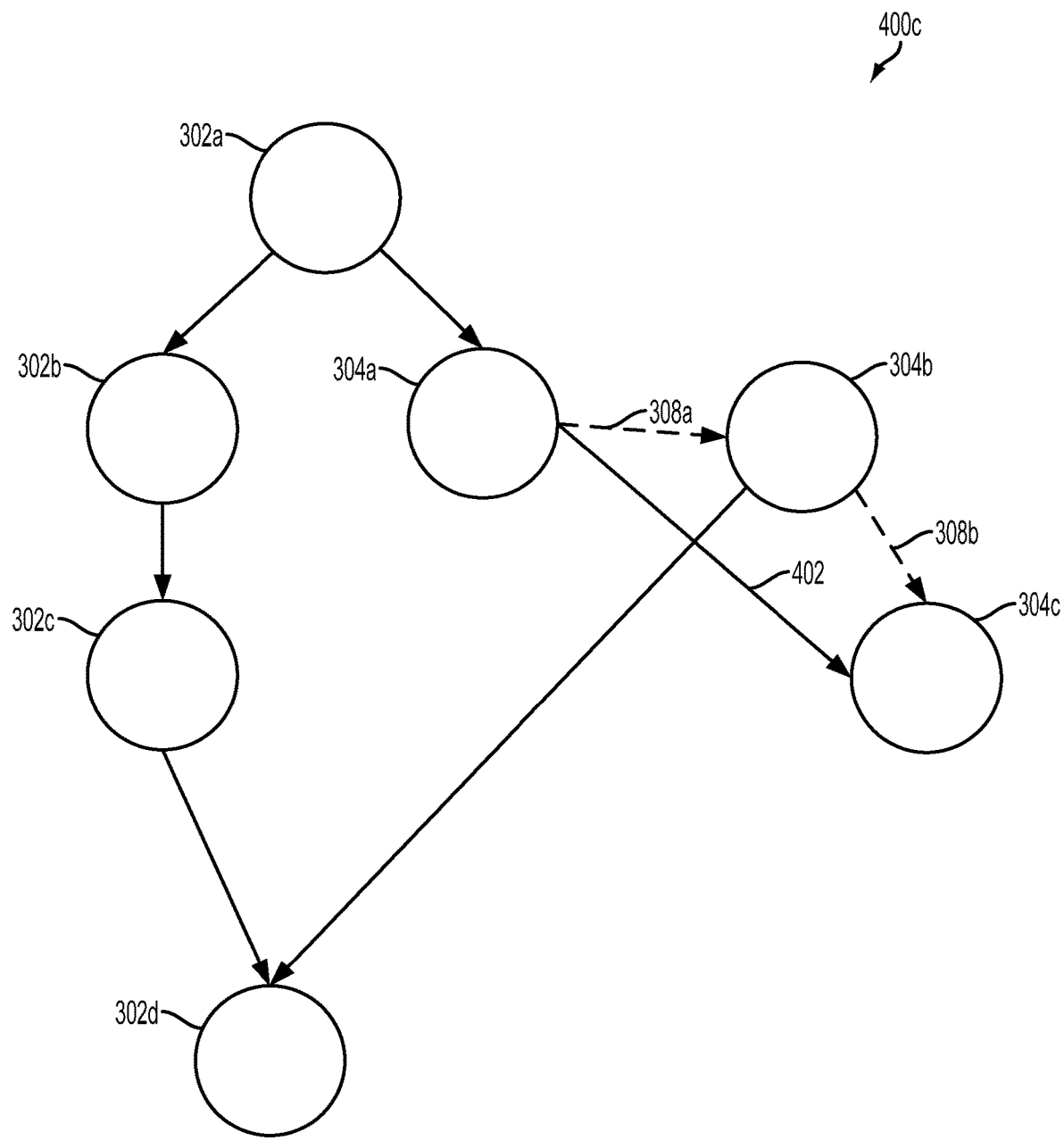

FIG. 4C illustrates an example task graph configuration 400c having the same structure as the task graph configuration 300c described with reference to FIG. 3C, with the addition of the task dependency edge 402 between the tasks 304a and 304c. The execution of the tasks 304a and 304b may be subject to the same example as described for the task graph configuration 300c. Further, the task 304c may now be dependent on the task 304a and dynamically dependent on the task 304b regardless of whether the resource subject to the dynamic task execution edges 308a and 308b is the same or not. However, relinquishing a first resource required to execute the task 304c by the task 304a may be insufficient to execute the task 304c, despite directly depending upon the task 304a, because a second resource required to execute the task 304c may be owned by the task 304b. In various embodiments, the scheduler may wake up the thread and/or processor for executing the task 304c to acquire the first resource relinquished by the task 304a. In various embodiments, the scheduler may allow the thread and/or processor for executing the task 304c to return to idle while waiting for the second resource to be relinquished by the task 304b. In various embodiments, the scheduler may wake up the thread and/or processor for executing the task 304c only when both the first and second resources are relinquished by the tasks 304a and 304b. In various embodiments, waiting to wake up the thread and/or processor for executing the task 304c only when both the first and second resources are available may be implemented when another task requires one of the first or second resources to execute.

In some situations, the same resource may be subject to the dynamic task dependency edge 308a and the dependency edge 402. In order to avoid a race condition for the resource relinquished by the task 304a and required by the tasks 304b and 304c, the task scheduler implementing various embodiments may prioritize an order of execution of the tasks 304b and 304c. In such a manner, the higher priority task may be notified of the availability of the resource relinquished by the task 304a while the lower priority task remains idle, or works on other unrelated ready tasks, and the lower priority task may be notified of the availability of the resource after it is relinquished by the higher priority task. In various embodiments, the task scheduler may prioritize the dynamic task dependency edges 308a and 308b over the dependency edge 402, such that the task scheduler may add the dynamic task dependency edge 308b so that the task 304b acquires the resource subject to its task conflict with the task 304c and executes before the task 304c.

Figure 4D:
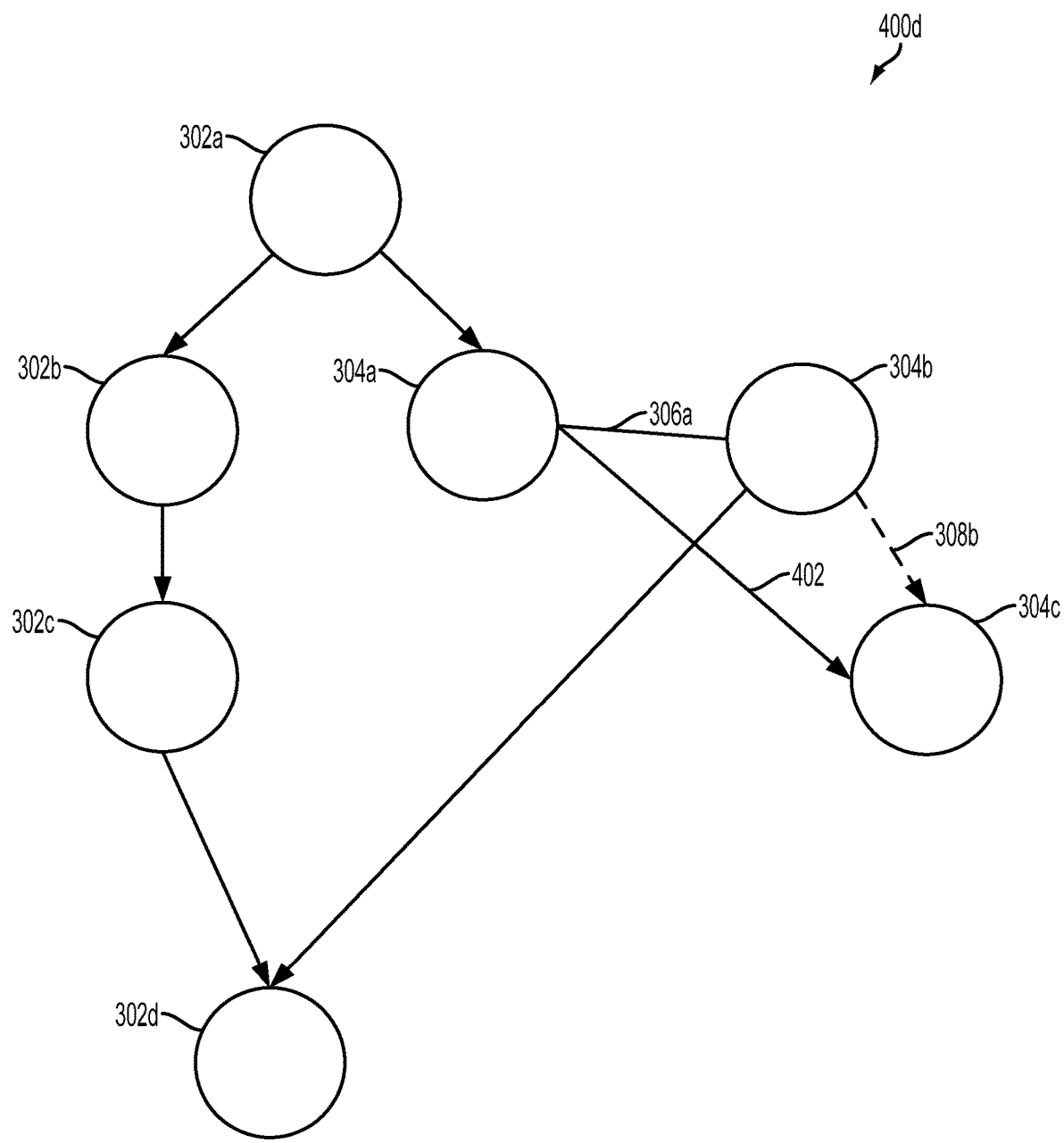

FIG. 4D illustrates the example task graph configuration 400d having the same structure as the task graph configuration 300d described with reference to FIG. 3D, with the addition of the task dependency edge 402 between the tasks 304a and 304c. The execution of the tasks 304a and 304b may be subject to the same example as described for the task graph configuration 300d. As described for the example task graph configuration 400c with reference to FIG. 4C, the scheduler may prioritize the execution of the tasks 304b and 304c using the dynamic task dependency edge 308b. As such, despite availability of the first resource relinquished by the task 304a, the execution of the task 304c may be delayed until completion of the task 304b because the dynamic task dependency edge 308b may direct the task scheduler to allow the task 304b to acquire the second resource before the task 304c.

Figure 5:
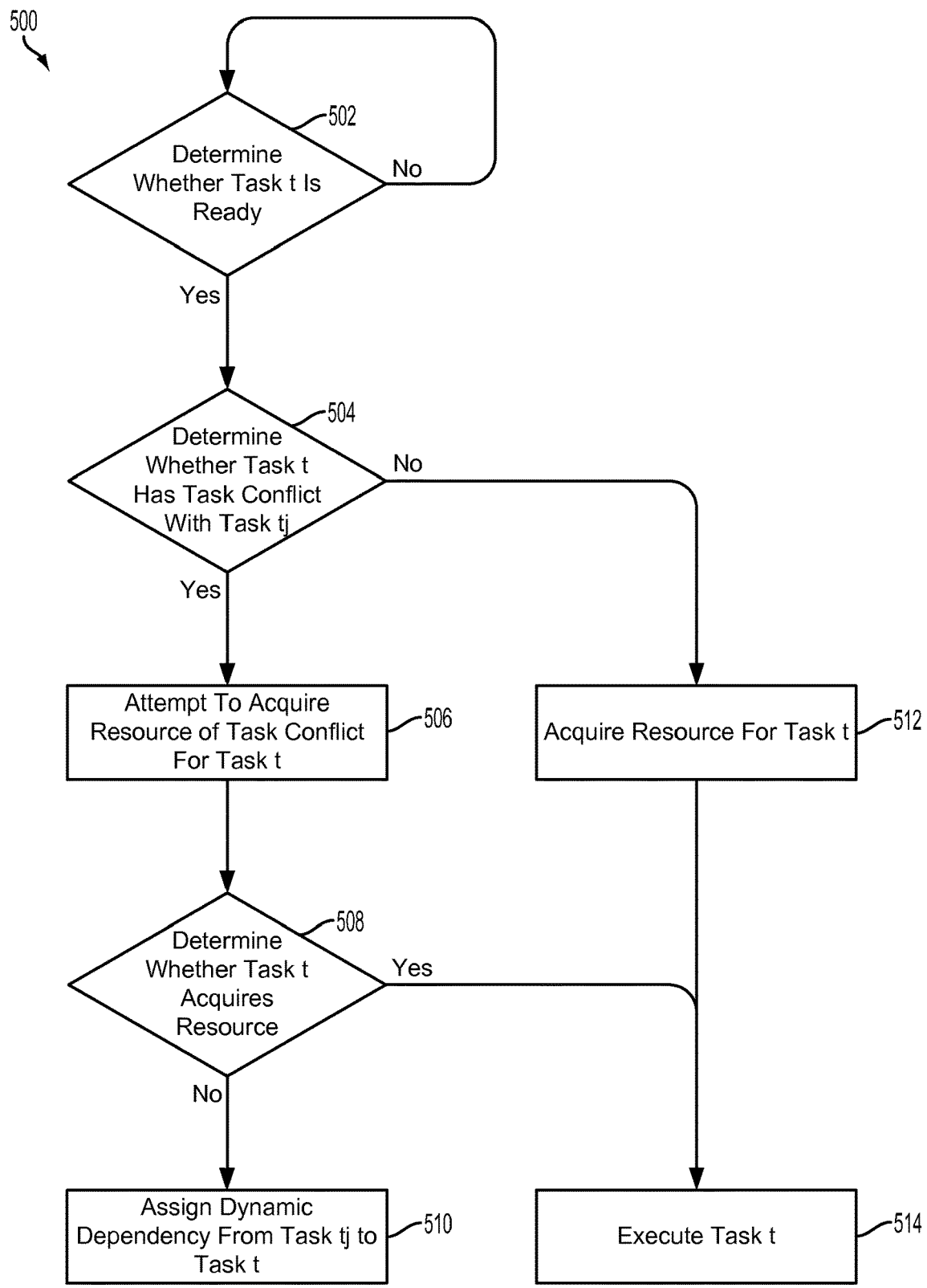
FIG. 5 is a process flow diagram illustrating an embodiment method for efficient task scheduling in the presence of task conflicts.

FIG. 5 illustrates an embodiment method 500 for task scheduling in the presence of task conflicts. The method 500 may be implemented in a computing device in software executing in a processor, in general purpose hardware, or dedicated hardware, and may be implemented as a task scheduler in any such configuration. In various embodiments, the method 500 may be implemented by multiple threads on multiple processors or hardware components.

In determination block 502, the computing device (e.g. a task scheduler implemented within the computing device) may determine whether a task t is a ready task. In order to determine whether the task t is a ready task, the computing device may determine whether the task t is dependent upon any other tasks. In some embodiments, the computing device may determine whether the task t is included in a data structure indicating a dependency and/or dynamic dependency from another task. This may include analyzing a single entry or multiple entries in a single or multiple data structures. Each such data structure may be dedicated to a particular task relationship, or may include multiple types of task relationships. A determination that the task t is entered as dependent upon another task may indicate that the task t is not a ready task. A determination that the task t is entered as not being dependent upon another task or is not entered in the data structure may indicate that the task t is not dependent upon another task, and is therefore a ready task.

In response to determining that the task t is not a ready task (i.e., determination block 502="No"), the computing device may continue to check whether the task t is a ready task in determination block 502.

In response to determining that the task t is a ready task (i.e., determination block 502="Yes"), the computing device may determine whether the task t has a task conflict with a task tj in determination block 504. As described further with reference to FIG. 6, the determination of whether the task t has a conflict with another task may be implemented for a number of tasks. Similar to determining whether the task t is dependent upon another task, the computing device may analyze a data structure to determine whether the task t has a conflict with the task tj, looking for entries indicating the conflict between the task t and the task tj. In various embodiments, the data structures may be configured to indicate a conflict relationship or may indicate the resources required by each task and the resources required may be compared to determine whether a conflict exists. For example, two tasks that require at least one same resource may have a conflict with each other.

In response to determining that the task t does not have a conflict with the task tj (i.e., determination block 504="No"), the computing device may acquire the resource(s) required for task t to execute in block 512. For example, a lock may be placed on the required resource so that no other task may access the task while task t executes. In various embodiments, acquiring the resource may not require exclusive access to the resource, and the resource may be shared by other tasks, such as when only read access is required, or different part of the resource are accessed. In block 514, the computing device may execute task t using the acquired resource.

In response to determining that the task t does have a conflict with the task tj (i.e., determination block 504="Yes"), the computing device may attempt to acquire the resources, including the resource subject to the task conflict, for executing task t in block 506. The computing device may attempt to acquire the resources in a manner similar to that described for block 512. In various embodiments, attempting to acquire the resources may use the resource availability tracking and/or deadlock avoidance techniques described with reference to FIG. 3A. In various embodiments, the computing device may check the availability of the resources before acquiring the resources. For resources that are available, the computing device may acquire the resources, and for resources that are unavailable, the computing device may skip acquiring the resources. In various embodiments, the computing device may acquire individual available resources when the individual resources are available, or may only acquire resources when a set of or all of the required resources are available.

In determination block 508, the computing device may determine whether the task t acquires the resources, including the resource subject to the task conflict, for executing task t. The computing device may fail to acquire any of the resources required for executing the task t when other tasks have ownership of the resource that does not allow the task t to take exclusive or shared ownership of the resource, depending on the needs of the task t for execution. In various embodiments, determinations regarding whether the task t acquires the resources may include receiving signals from the task indicating acquisition of the resources, or using the resource availability tracking by checking the address of the task (or "task pointer") set in the bytes in memory for the resource.

In response to determining that the computing device failed to acquire the resources, including the resource subject to the task conflict, for executing task t (i.e., determination block 508="No"), the computing device may assign a dynamic task dependency edge from task tj to task t in block 510. In other words, the computing device may make the task t dynamically dependent upon task tj, requiring that task tj relinquish a resource need for execution of task t before task t may be executed. Assigning the dynamic task dependency edge from task tj to task t is described further with reference to FIG. 6.

In response to determining that the computing device acquired the resources, including the resource subject to the task conflict, for executing task t (i.e., determination block 508="Yes"), the computing device may execute task t using the acquired resource in block 514.

Figure 6:
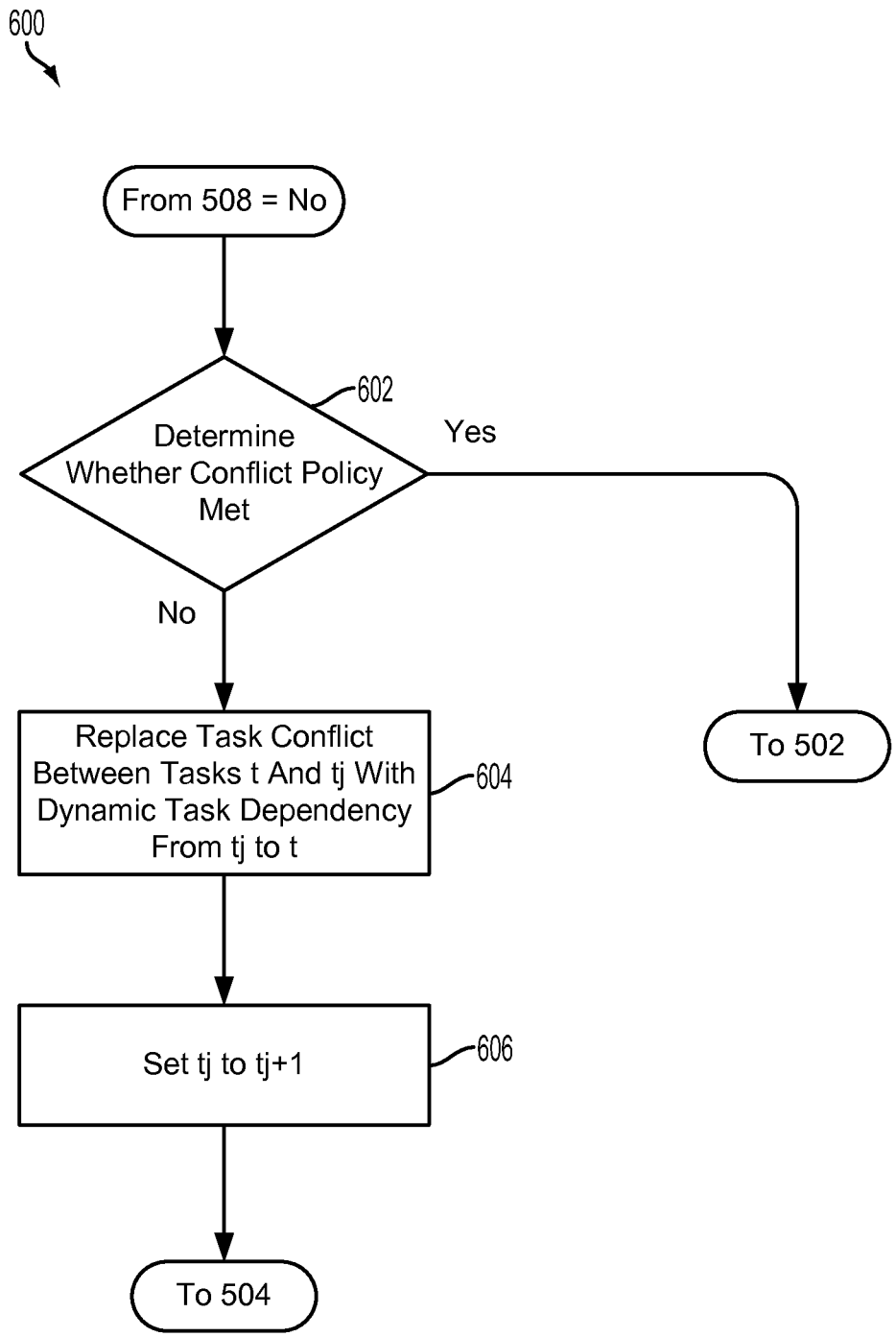
FIG. 6 is a process flow diagram illustrating an embodiment method for assigning dynamic task dependencies.

FIG. 6 illustrates an embodiment method 600 for assigning dynamic task dependencies. The method 600 may be implemented in a computing device in software executing in a processor, in general purpose hardware, or dedicated hardware, and may be implemented as a task scheduler in any such configuration. In various embodiments, the method 600 may be implemented by multiple threads on multiple processors or hardware components. In various embodiments, the method 600 may be implemented as part of the block 510, as described with reference to FIG. 5.

In determination block 602, the computing device (e.g., a task scheduler executing within the computing device) may determine whether a conflict policy is met. In various embodiments, the conflict policy may determine how many dynamic task dependency edges to assign to the task t per assignment session. In other words, the conflict policy may interrupt the assignment session in response to a certain number of dynamic task dependency edges being assigned to the task t regardless of whether other tasks yet to be analyzed for conflict with task t remain. The task policy may be set depending on various factors, such as task latency, power consumption, and task criticality. For example, to increase task latency, the policy may increase the number of dynamic task dependency edges being assigned to the task t, and may decrease the number of dynamic task dependency edges to decrease task latency. The determination of whether the conflict policy is met may also be based on time, number of executions of other tasks, processor cycles, and other metrics.

The task latency may be related to the number of dynamic task dependency edges because the more tasks that the task t has to wait for to finish before attempting to acquire the required resources, the longer it may take to do so. Similarly, fewer dynamic task dependency edges may allow the task t to attempt to acquire the required resources more frequently, and therefore potentially sooner. In another example, the power consumption relationship with the number of dynamic task dependency edges may be inversely related to the latency. The fewer dynamic task dependency edges, the more frequently the task t attempts to acquire the required task, thus the less idle time and more active for the thread and/or processor assigned for executing task t. In another example, the higher the criticality of task, the fewer the dynamic task dependency edges may be assigned so that the task may potentially execute more contemporaneously with a critical period for execution.

In response to determining that the conflict policy is met (i.e., determination block 602="Yes"), the computing device may determine whether a task t is a ready task in determination block 502 and continue with method 500 as described with reference to FIG. 5.

In response to determining that the conflict policy is not met (i.e., determination block 602="No"), the computing device may replace the task conflict edge between task t and task tj with a dynamic task dependency edge from task tj to task t in block 604. As described with reference to FIG. 5, the computing device may maintain data structures indicating the relationships between tasks. In order to replace the task conflict edge between task t and task tj with a dynamic task dependency edge from task tj to task t, the computing device may create or update an entry in one or more data structures to indicate the removal of the task conflict edge and the addition of the dynamic task dependency edge. In various embodiments, entries indicating various relationships and various tasks may be maintained in one or multiple data structures. In various embodiments, it may not be necessary to remove or edit the task edge conflict entry as the dynamic task dependency edge entry may simply supersede other relationship entries.

In block 606, the computing device may change the task to which tj relates, for example, by setting task tj to tj+1. As described herein, the assignment of dynamic task dependency edges may continue until a conflict policy is met or until there are no more tasks to conflict with the task t. However, as long as there are remaining tasks and the conflict policy is not met, task t may be compared to a next task. In determination block 504, the computing device may determine whether the task t has a task conflict with a task tj and continue with the method 500 as described with reference to FIG. 5.

In various embodiments, it may be important to ensure that the task tj does not complete in the time between determining that the task t cannot acquire the resource required to execute that is owned by the conflicting task tj and replacing the task conflict edge with a dynamic task dependency edge. This constraint may help to prevent the task t from languishing waiting to be signaled that the resource is available because the resource became available before the dynamic task dependency edge was added. Therefore, task t may not attempt to acquire the resource until the next completed execution of the task tj, or some other metric as noted with reference to FIG. 6. This delay may also cascade to other tasks that are directly or indirectly dependent upon task t. The methods described with reference to FIGS. 7 and 8 relate to ensuring the atomicity of the ownership of the task tj and the addition of the dynamic task dependency edge from task tj to task t.

Figure 7:
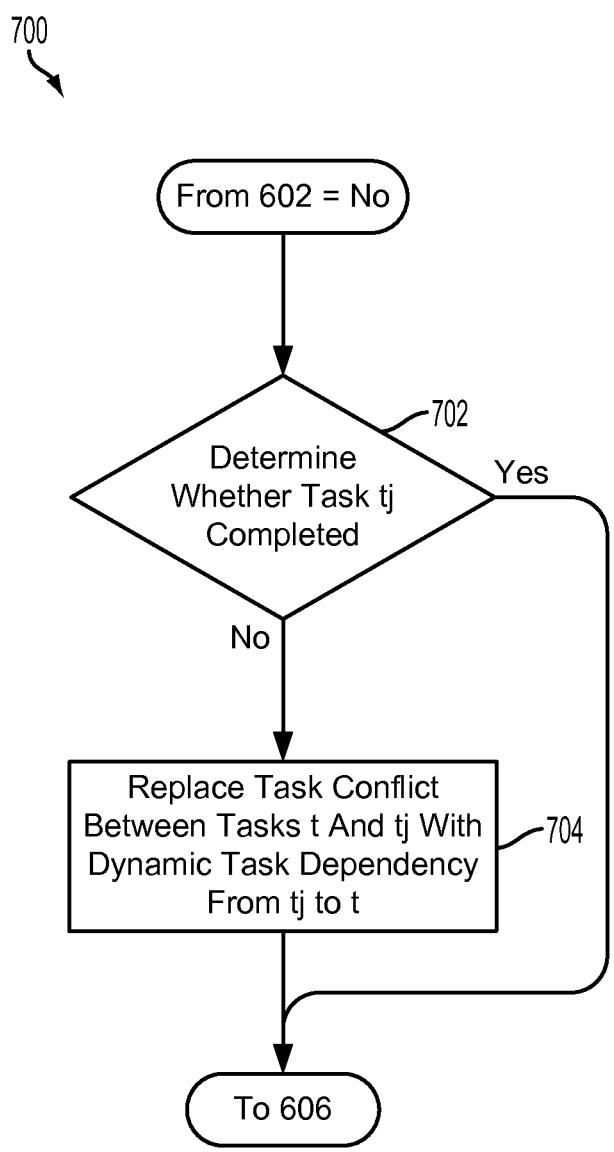
FIG. 7 is a process flow diagram illustrating an embodiment method for replacing a task conflict with a dynamic task dependency.

FIG. 7 illustrates an embodiment method 700 for replacing a task conflict with a dynamic task dependency. The method 700 may be implemented in a computing device in software executing in a processor, in general purpose hardware, or dedicated hardware, and may be implemented as a task scheduler in any such configuration. In various embodiments, the method 700 may be implemented by multiple threads on multiple processors or hardware components. In various embodiments, the method 700 may be implemented as part of the block 604, as described with reference to FIG. 6.

In determination block 702, the computing device (e.g., a task scheduler executing in a computing device) may determine whether execution of task tj is completed. In various embodiments, the computing device may receive a signal from the task tj or the thread and/or processor executing task tj that execution is completed. The signal may be received by the scheduler of the computing device. In response to determining that the execution of the task tj is not completed (i.e., determination block 702="No"), the computing device may replace the task conflict edge with the dynamic task dependency edge from task tj to task t in block 704, as described in block 604 with reference to FIG. 6. In response to determining that the execution of the task tj is completed (i.e., determination block 702="Yes") of after replacing the task conflict edge with the dynamic task dependency edge from task tj to task t in block 704, the computing device may change the task to which tj relates in block 606 and proceed with the method 600 as described with reference to FIG. 6.

Figure 8:
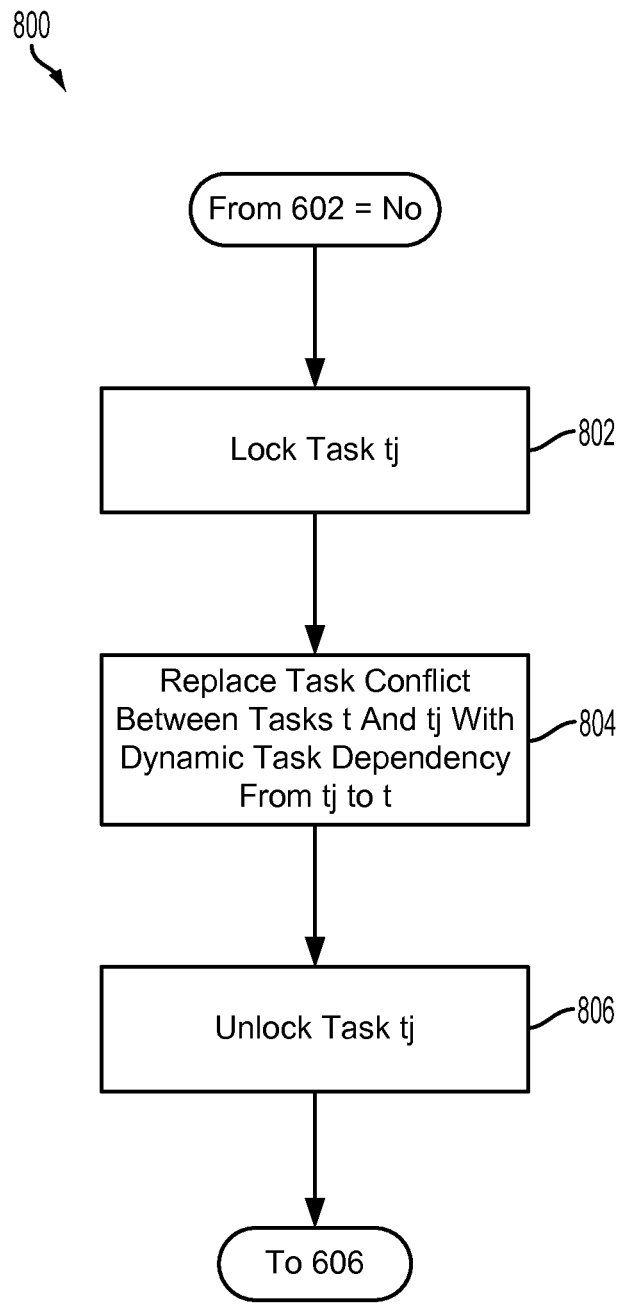
FIG. 8 is a process flow diagram illustrating an embodiment method for replacing a task conflict with a dynamic task dependency.

FIG. 8 illustrates an embodiment method 800 for replacing a task conflict with a dynamic task dependency. The method 800 may be implemented in a computing device in software executing in a processor, in general purpose hardware, or dedicated hardware, and may be implemented as a task scheduler in any such configuration. In various embodiments, the method 800 may be implemented by multiple threads on multiple processors or hardware components. In various embodiments, the method 800 may be implemented as part of the block 604, as described with reference to FIG. 6.

In block 802, the computing device (e.g., a task scheduler executing in the computing device) may lock the task tj. In various embodiments, the computing device may lock the task tj by interrupting the execution of task tj with an interrupt signal or command to the thread and/or processors assigned to execute task tj, thereby pausing the execution of the task tj. In various embodiments, the computing device may lock the task tj by acquiring exclusive access to, or otherwise preventing the task tj from accessing one or more resources required by task tj for execution, similarly pausing the execution of the task tj.

In block 804, the computing device may replace the task conflict edge with the dynamic task dependency edge from task tj to task t similar to the operations in block 604 of the method 600 described with reference to FIG. 6.

In block 806, the computing device may unlock the task tj. In various embodiments, the computing device may unlock the task tj by resuming the execution of task tj with a resume signal or command to the thread and/or processors assigned to execute task tj, thereby unpausing the execution of the task tj. In various embodiments, the computing device may unlock the task tj by relinquishing exclusive access to, or otherwise allowing the task tj to access the one or more resources required by task tj for execution, similarly unpausing the execution of the task tj. The computing device may then change the task to which tj relates in block 606 and proceed with the method 600 as described with reference to FIG. 6

Figure 9:
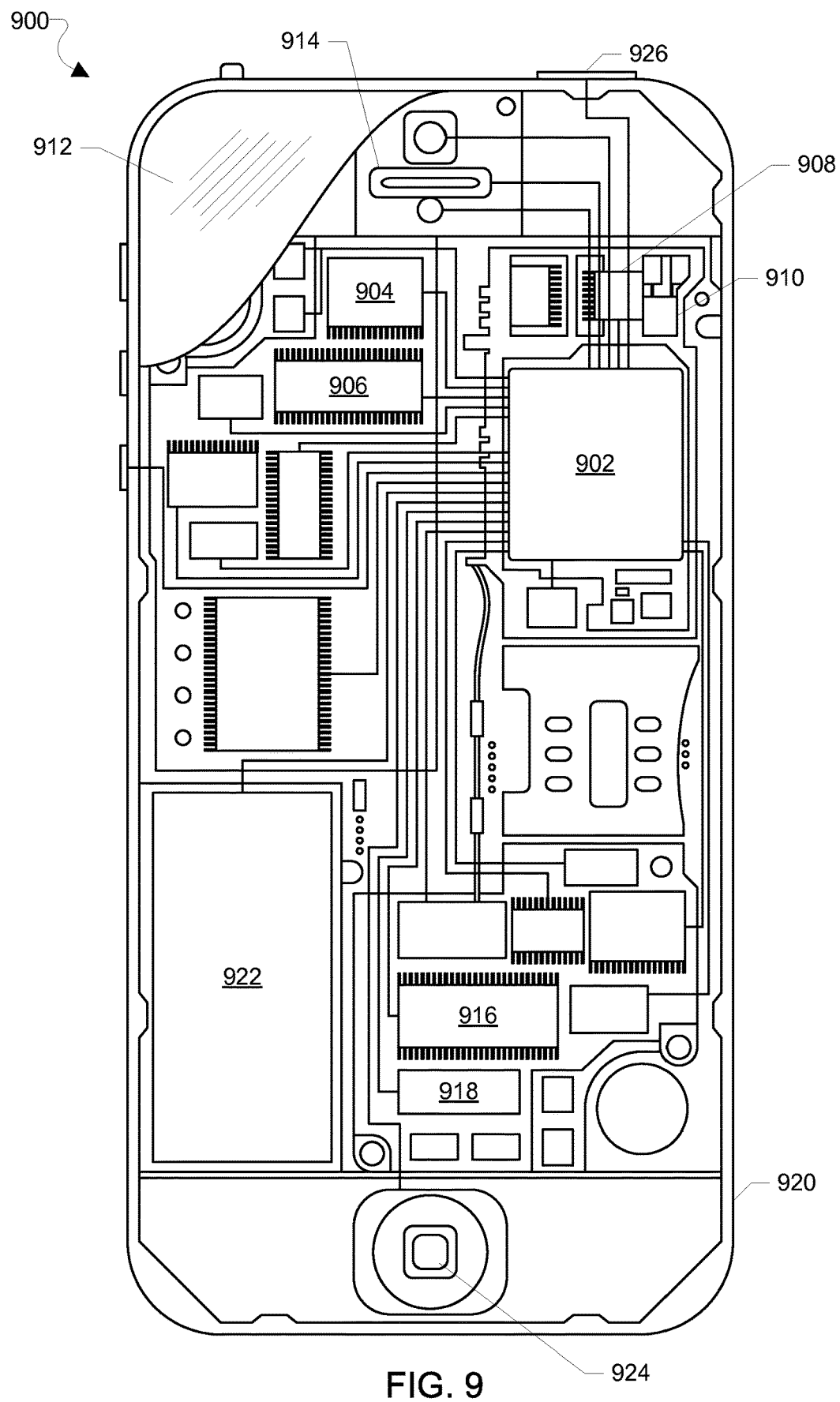
FIG. 9 is component block diagram illustrating an example mobile computing device suitable for use with the various embodiments.

The various embodiments (including, but not limited to, embodiments discussed above with reference to FIGS. 1-8) may be implemented in a wide variety of computing systems, which may include an example mobile computing device suitable for use with the various embodiments illustrated in FIG. 9. The mobile computing device 900 may include a processor 902 coupled to a touchscreen controller 904 and an internal memory 906. The processor 902 may be one or more multicore integrated circuits designated for general or specific processing tasks. The internal memory 906 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the computing device 900 need not have touch screen capability.

The mobile computing device 900 may have one or more radio signal transceivers 908 (e.g., Peanut, Bluetooth, Zigbee, Wi-Fi, RF radio) and antennae 910, for sending and receiving communications, coupled to each other and/or to the processor 902. The transceivers 908 and antennae 910 may be used with the above-mentioned circuitry to implement the various wireless transmission protocol stacks and interfaces. The mobile computing device 900 may include a cellular network wireless modem chip 916 that enables communication via a cellular network and is coupled to the processor.

The mobile computing device 900 may include a peripheral device connection interface 918 coupled to the processor 902. The peripheral device connection interface 918 may be singularly configured to accept one type of connection, or may be configured to accept various types of physical and communication connections, common or proprietary, such as USB, FireWire, Thunderbolt, or PCIe. The peripheral device connection interface 918 may also be coupled to a similarly configured peripheral device connection port (not shown).

The mobile computing device 900 may also include speakers 914 for providing audio outputs. The mobile computing device 900 may also include a housing 920, constructed of a plastic, metal, or a combination of materials, for containing all or some of the components discussed herein. The mobile computing device 900 may include a power source 922 coupled to the processor 902, such as a disposable or rechargeable battery. The rechargeable battery may also be coupled to the peripheral device connection port to receive a charging current from a source external to the mobile computing device 900. The mobile computing device 900 may also include a physical button 924 for receiving user inputs. The mobile computing device 900 may also include a power button 926 for turning the mobile computing device 900 on and off.

Figure 10:
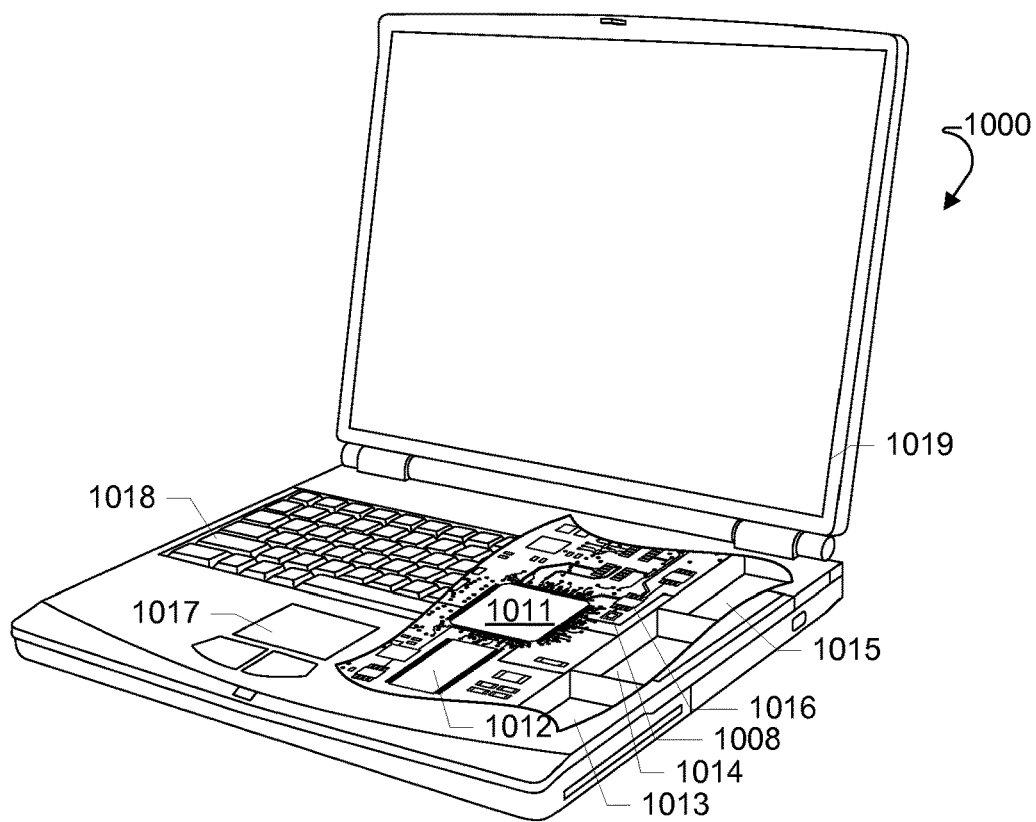
FIG. 10 is component block diagram illustrating an example mobile computing device suitable for use with the various embodiments.

The various embodiments (including, but not limited to, embodiments discussed above with reference to FIGS. 1-8) may be implemented in a wide variety of computing systems, which may include a variety of mobile computing devices, such as a laptop computer 1000 illustrated in FIG. 10. Many laptop computers include a touchpad touch surface 1017 that serves as the computer's pointing device, and thus may receive drag, scroll, and flick gestures similar to those implemented on computing devices equipped with a touch screen display and described above. A laptop computer 1000 will typically include a processor 1011 coupled to volatile memory 1012 and a large capacity nonvolatile memory, such as a disk drive 1013 of Flash memory. Additionally, the computer 1000 may have one or more antenna 1008 for sending and receiving electromagnetic radiation that may be connected to a wireless data link and/or cellular telephone transceiver 1016 coupled to the processor 1011. The computer 1000 may also include a floppy disc drive 1014 and a compact disc (CD) drive 1015 coupled to the processor 1011. In a notebook configuration, the computer housing includes the touchpad 1017, the keyboard 1018, and the display 1019 all coupled to the processor 1011. Other configurations of the computing device may include a computer mouse or trackball coupled to the processor (e.g., via a USB input) as are well known, which may also be used in conjunction with the various embodiments.

Figure 11:
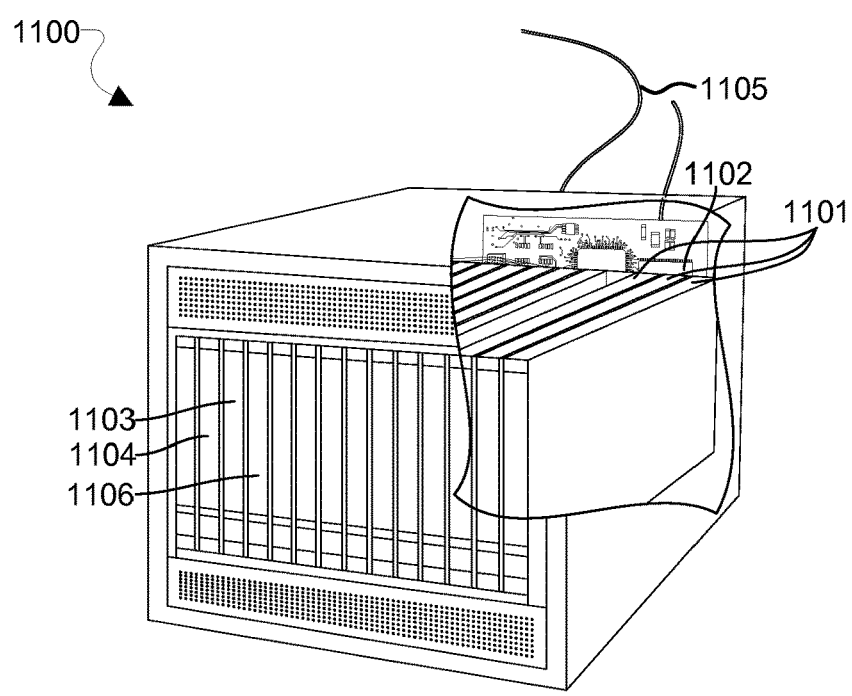
FIG. 11 is component block diagram illustrating an example server suitable for use with the various embodiments.

The various embodiments (including, but not limited to, embodiments discussed above with reference to FIGS. 1-8) may be implemented in a wide variety of computing systems, which may include any of a variety of commercially available servers for compressing data in server cache memory. An example server 1100 is illustrated in FIG. 11. Such a server 1100 typically includes one or more multi-core processor assemblies 1101 coupled to volatile memory 1102 and a large capacity nonvolatile memory, such as a disk drive 1104. As illustrated in FIG. 11, multi-core processor assemblies 1101 may be added to the server 1100 by inserting them into the racks of the assembly. The server 1100 may also include a floppy disc drive, compact disc (CD) or digital versatile disc (DVD) disc drive 1106 coupled to the processor 1101. The server 1100 may also include network access ports 1103 coupled to the multi-core processor assemblies 1101 for establishing network interface connections with a network 1105, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of task scheduling in the presence of task conflict edges on a computing device, comprising:
   determining whether a first task and a second task are related by a task conflict edge configured to indicate that the first task and the second task are schedulable to execute in any order and not dependent on execution of the other of the first task and the second task;
   scheduling the second task to execute using a resource required for execution of the first task and the second task irrespective of when the first task is scheduled to execute using the resource based on the task conflict edge between the first task and the second task;
   acquiring the resource by the first task, wherein a deadlock and a cyclic dynamic task dependency are avoided by requiring that the resource be processed in an order related to at least one other resource required for execution of the second task or a third task;
   determining whether the second task attempts to acquire the resource in response to determining that the first task and the second task are related by the task conflict edge;
   in response to the second task attempting to acquire the resource:
      locking the first task while the first task is executing, wherein locking the first task pauses execution of the first task;
      assigning a dynamic task dependency edge from the locked first task to the second task by replacing the task conflict edge with the dynamic task dependency edge, wherein the dynamic task dependency edge is configured to indicate that the second task is schedulable to execute in an order in which the first task executes before the second task executes; and
      unlocking and resuming execution of the locked first task; and
   rescheduling the second task to execute using the resource after the first task releases the resource based on the dynamic task dependency edge from the first task to the second task.

2. The method of claim 1, wherein assigning a dynamic task dependency edge from the first task to the second task comprises:
   determining whether an execution of the first task is complete; and
   assigning the dynamic task dependency edge from the first task to the second task in response to determining that the execution of the first task is not complete.

3. The method of claim 1, wherein assigning a dynamic task dependency edge from the first task to the second task comprises:
   removing an indicator of the task conflict edge from a data structure; and
   adding an indicator of the dynamic task dependency edge to the data structure.

4. The method of claim 1, wherein rescheduling the second task to execute using the resource after the first task releases the resource based on the dynamic task dependency edge from the first task to the second task comprises:

signaling a processor core assigned to execute the second task to enter an idle state in response to assigning the dynamic task dependency edge from the first task to the second task;
receiving a signal that the first task is complete; and
signaling the processor core assigned to execute the second task to wake up from the idle state.

5. The method of claim 1, further comprising:
determining whether a conflict policy is met; and
determining whether the second task is a ready task in response to determining that the conflict policy is met,
wherein in response to the second task attempting to acquire the resource:
  locking the first task while the first task is executing;
  assigning the dynamic task dependency edge from the locked first task to the second task; and
  unlocking the locked first task,
comprises in response to the second task attempting to acquire the resource and determining that the conflict policy is not met:
  locking the first task while the first task is executing;
  assigning the dynamic task dependency edge from the locked first task to the second task; and
  unlocking the locked first task.

6. The method of claim 5, wherein determining whether the conflict policy is met further comprises determining whether a threshold amount of dynamic task dependency edges are assigned to the second task in an assignment session.

7. The method of claim 5, wherein the conflict policy comprises a threshold amount of dynamic task dependency edges assigned to the second task in an assignment session, and wherein the threshold amount of dynamic task dependency edges is determined based at least on one of power consumption for execution tasks, task execution latency, and criticality of the second task.

8. A computing device configured for task scheduling in the presence of task conflict edges, comprising:
a resource, including a memory device, required for execution of a first task and a second task; and
a plurality of processor cores communicatively connected to each other including a first processor core, a second processor core, and a third processor core, wherein the second processor core and the third processor core are communicatively connected to the resource and the first processor core is configured with processor-executable instructions to:
  determine whether the first task and the second task are related by a task conflict edge configured to indicate that the first task and the second task are schedulable to execute in any order and not dependent on execution of the other of the first task and the second task;
  schedule the second task to execute using the resource required for execution of the first task and the second task irrespective of when the first task is scheduled to execute using the resource based on the task conflict edge between the first task and the second task;
  determine whether the second task attempts to acquire the resource in response to determining that the first task and the second task are related by the task conflict edge;
  in response to the second task attempting to acquire the resource:
    lock the first task while the first task is executing, wherein locking the first task pauses execution of the first task;
    assign a dynamic task dependency edge from the locked first task to the second task by replacing the task conflict edge with the dynamic task dependency edge, wherein the dynamic task dependency edge is configured to indicate that the second task is schedulable to execute in an order in which the first task executes before the second task executes; and
    unlock and resume execution of the locked first task; and
  reschedule the second task to execute using the resource after the first task releases the resource based on the dynamic task dependency edge from the first task to the second task; and
  wherein the second processor core is configured with processor-executable instructions to acquire the resource by the first task, wherein a deadlock and a cyclic dynamic task dependency are avoided by requiring that the resource be processed in an order related to at least one other resource required for execution of the second task or a third task.

9. The computing device of claim 8, wherein the first processor core is further configured with processor-executable instructions to assign a dynamic task dependency edge from the first task to the second task by:
determining whether an execution of the first task is complete; and
assigning the dynamic task dependency edge from the first task to the second task in response to determining that the execution of the first task is not complete.

10. The computing device of claim 8, wherein the first processor core is further configured with processor-executable instructions to assign a dynamic task dependency edge from the first task to the second task by:
removing an indicator of the task conflict edge from a data structure; and
adding an indicator of the dynamic task dependency edge to the data structure.

11. The computing device of claim 8, wherein
the first processor core is further configured with processor-executable instructions to reschedule the second task to execute using the resource after the first task releases the resource based on the dynamic task dependency edge from the first task to the second task by:
signaling the third processor core assigned to execute the second task to enter an idle state in response to assigning the dynamic task dependency edge from the first task to the second task;
receiving a signal that the first task is complete; and
signaling the third processor core assigned to execute the second task to wake up from the idle state.

12. The computing device of claim 8, wherein the first processor core is further configured with processor-executable instructions to:
determine whether a conflict policy is met; and
determine whether the second task is a ready task in response to determining that the conflict policy is met,
wherein in response to the second task attempting to acquire the resource:
  lock the first task while the first task is executing;
  assign the dynamic task dependency edge from the locked first task to the second task; and
  unlock the locked first task,
comprises in response to the second task attempting to acquire the resource and determining that the conflict policy is not met:

locking the first task while the first task is executing;
assigning the dynamic task dependency edge from the locked first task to the second task; and
unlocking the locked first task.

13. The computing device of claim 12, wherein the first processor core is further configured with processor-executable instructions to determine whether the conflict policy is met further by determining whether a threshold amount of dynamic task dependency edges are assigned to the second task in an assignment session.

14. The computing device of claim 12, wherein the conflict policy comprises a threshold amount of dynamic task dependency edges assigned to the second task in an assignment session, and wherein the threshold amount of dynamic task dependency edges is determined based at least on one of power consumption for execution tasks, task execution latency, and criticality of the second task.

15. A computing device configured for task scheduling in the presence of task conflict edges, comprising:
    means for determining whether a first task and a second task are related by a task conflict edge configured to indicate that the first task and the second task are schedulable to execute in any order and not dependent on execution of the other of the first task and the second task;
    means for scheduling the second task to execute using a resource required for execution of the first task and the second task irrespective of when the first task is scheduled to execute using the resource based on the task conflict edge between the first task and the second task;
    means for acquiring the resource by the first task, wherein a deadlock and a cyclic dynamic task dependency are avoided by requiring that the resource be processed in an order related to at least one other resource required for execution of the second task or a third task;
    means for determining whether the second task attempts to acquire the resource in response to determining that the first task and the second task are related by the task conflict edge;
    in response to the second task attempting to acquire the resource:
        means for locking the first task while the first task is executing, wherein locking the first task pauses execution of the first task;
        means for assigning a dynamic task dependency edge from the locked first task to the second task comprising means for replacing the task conflict edge with the dynamic task dependency edge, wherein the dynamic task dependency edge is configured to indicate that the second task is schedulable to execute in an order in which the first task executes before the second task executes; and
        means for unlocking the locked first task, wherein the means for unlocking the first task further comprises means for resuming execution of the first task; and
    means for rescheduling the second task to execute using the resource after the first task releases the resource based on the dynamic task dependency edge from the first task to the second task.

16. The computing device of claim 15, wherein means for assigning a dynamic task dependency edge from the first task to the second task comprises:
    means for determining whether an execution of the first task is complete; and
    means for assigning the dynamic task dependency edge from the first task to the second task in response to determining that the execution of the first task is not complete.

17. The computing device of claim 15, wherein means for assigning a dynamic task dependency edge from the first task to the second task comprises:
    means for removing an indicator of the task conflict edge from a data structure; and
    means for adding an indicator of the dynamic task dependency edge to the data structure.

18. The computing device of claim 15, wherein means for rescheduling the second task to execute using the resource after the first task releases the resource based on the dynamic task dependency edge from the first task to the second task comprises:
    means for signaling a processor core assigned to execute the second task to enter an idle state in response to assigning the dynamic task dependency edge from the first task to the second task;
    means for receiving a signal that the first task is complete; and
    means for signaling the processor core assigned to execute the second task to wake up from the idle state.

19. The computing device of claim 15, further comprising:
    means for determining whether a conflict policy is met; and
    means for determining whether the second task is a ready task in response to determining that the conflict policy is met,
    wherein in response to the second task attempting to acquire the resource:
        means for locking the first task while the first task is executing;
        means for assigning a dynamic task dependency edge from the locked first task to the second task; and
        means for unlocking the locked first task,
    comprises in response to the second task attempting to acquire the resource and determining that the conflict policy is not met:
        means for locking the first task while the first task is executing;
        means for assigning the dynamic task dependency edge from the locked first task to the second task; and
        means for unlocking the locked first task.

20. The computing device of claim 19, wherein means for determining whether the conflict policy is met further comprises means for determining whether a threshold amount of dynamic task dependency edges are assigned to the second task in an assignment session, wherein the conflict policy comprises the threshold amount of dynamic task dependency edges assigned to the second task in an assignment session, and wherein the threshold amount of dynamic task dependency edges is determined based at least on one of power consumption for execution tasks, task execution latency, and criticality of the second task.

21. A non-transitory processor-readable storage medium having stored thereon processor-executable instructions configured to cause a processor of a computing device to perform operations comprising:
    determining whether a first task and a second task are related by a task conflict edge configured to indicate that the first task and the second task are schedulable to execute in any order and not dependent on execution of the other of the first task and the second task;

scheduling the second task to execute using a resource required for execution of the first task and the second task irrespective of when the first task is scheduled to execute using the resource based on the task conflict edge between the first task and the second task;

acquiring the resource by the first task, wherein a deadlock and a cyclic dynamic task dependency are avoided by requiring that the resource be processed in an order related to at least one other resource required for execution of the second task or a third task;

determining whether the second task attempts to acquire the resource in response to determining that the first task and the second task are related by the task conflict edge;

in response to the second task attempting to acquire the resource:
  locking the first task while the first task is executing, wherein locking the first task pauses execution of the first task;
  assigning a dynamic task dependency edge from the locked first task to the second task by replacing the task conflict edge with the dynamic task dependency edge, wherein the dynamic task dependency edge is configured to indicate that the second task is schedulable to execute in an order in which the first task executes before the second task executes; and
  unlocking and resuming execution of the locked first task; and rescheduling the second task to execute using the resource after the first task releases the resource based on the dynamic task dependency edge from the first task to the second task.

22. The non-transitory processor-readable storage medium of claim 21, wherein the stored processor-executable instructions are configured to cause the processor to perform operations such that assigning a dynamic task dependency edge from the first task to the second task comprises:
  determining whether an execution of the first task is complete; and
  assigning the dynamic task dependency edge from the first task to the second task in response to determining that the execution of the first task is not complete.

23. The non-transitory processor-readable storage medium of claim 21, wherein the stored processor-executable instructions are configured to cause the processor to perform operations such that assigning a dynamic task dependency edge from the first task to the second task comprises:
  removing an indicator of the task conflict edge from a data structure; and
  adding an indicator of the dynamic task dependency edge to the data structure.

24. The non-transitory processor-readable storage medium of claim 21, wherein:
  the stored processor-executable instructions are configured to cause the processor to perform operations such that rescheduling the second task to execute using the resource after the first task releases the resource based on the dynamic task dependency edge from the first task to the second task comprises:
    signaling a processor core assigned to execute the second task to enter an idle state in response to assigning the dynamic task dependency edge from the first task to the second task;
    receiving a signal that the first task is complete; and
    signaling the processor core assigned to execute the second task to wake up from the idle state.

25. The non-transitory processor-readable storage medium of claim 21, wherein the stored processor-executable instructions are configured to cause the processor to perform operations further comprising:
  determining whether a conflict policy is met; and
  determining whether the second task is a ready task in response to determining that the conflict policy is met,
  wherein in response to the second task attempting to acquire the resource:
    locking the first task while the first task is executing;
    assigning the dynamic task dependency edge from the locked first task to the second task; and
    unlocking the locked first task,
  comprises in response to the second task attempting to acquire the resource and determining that the conflict policy is not met:
    locking the first task while the first task is executing;
    assigning the dynamic task dependency edge from the locked first task to the second task; and
    unlocking the locked first task.

26. The non-transitory processor-readable storage medium of claim 25, wherein the stored processor-executable instructions are configured to cause the processor to perform operations such that determining whether the conflict policy is met further comprises determining whether a threshold amount of dynamic task dependency edges are assigned to the second task in an assignment session,
  wherein the conflict policy comprises the threshold amount of dynamic task dependency edges assigned to the second task in an assignment session, and
  wherein the threshold amount of dynamic task dependency edges is determined based at least on one of power consumption for execution tasks, task execution latency, and criticality of the second task.

* * * * *